United States Patent
Rubenstein

(10) Patent No.: US 10,922,286 B2
(45) Date of Patent: Feb. 16, 2021

(54) NETWORK SLINGHOP VIA TAPESTRY SLINGSHOT

(71) Applicant: UMBRA Technologies Limited, Hong Kong (CN)

(72) Inventor: Joseph E. Rubenstein, Beijing (CN)

(73) Assignee: UMBRA TECHNOLOGIES LIMITED, Hong Kong (CN)

(*) Notice: Subject to any disclaimer, the term of this patent is extended or adjusted under 35 U.S.C. 154(b) by 81 days.

(21) Appl. No.: 16/095,881

(22) PCT Filed: Apr. 26, 2017

(86) PCT No.: PCT/IB2017/000613
§ 371 (c)(1),
(2) Date: Oct. 23, 2018

(87) PCT Pub. No.: WO2017/187268
PCT Pub. Date: Nov. 2, 2017

(65) Prior Publication Data
US 2020/0142866 A1    May 7, 2020

Related U.S. Application Data

(60) Provisional application No. 62/327,907, filed on Apr. 26, 2016, provisional application No. 62/327,846, (Continued)

(51) Int. Cl.
*G06F 16/00* (2019.01)
*G06F 16/18* (2019.01)
(Continued)

(52) U.S. Cl.
CPC .... *G06F 16/1858* (2019.01); *G06F 15/17331* (2013.01); *H04L 67/06* (2013.01);
(Continued)

(58) Field of Classification Search
CPC .......... G06F 16/1858; G06F 15/17331; H04W 88/14; H04L 67/2842; H04L 67/322; H04L 67/2876; H04L 67/06; H04L 67/1097
See application file for complete search history.

(56) References Cited

U.S. PATENT DOCUMENTS 5,940,838 A    8/1999    Schmuck et al.
6,209,039 B1    3/2001    Albright et al.
(Continued)

FOREIGN PATENT DOCUMENTS

CN    101079896 A    11/2007
CN    101282448 A    10/2008
(Continued)

OTHER PUBLICATIONS

Long Gong, Yonggang Wen, Zuqing Zhu, and Tony Lee, "Revenue-Driven Virtual Network Embedding Based on Global Resource Information", Globecom 2013, Next Generation Networking Symposium, pp. 2294-2299. (Year: 2013).*
(Continued)

*Primary Examiner* — Cheryl Lewis
(74) *Attorney, Agent, or Firm* — Wilmer Cutler Pickering Hale and Dorr LLP

(57) ABSTRACT

A network system for providing long haul network connection between endpoint devices is disclosed. The network system includes a first and a second endpoint devices, a first and a second exchange servers, a first access point server coupled between the first endpoint device and the first exchange server, a second access point server coupled between the second endpoint device and the second exchange server, a first storage node coupled between the first exchange server and the second exchange server, and a second storage node coupled between the first exchange server and the second exchange server. The first exchange
(Continued)

server is configured to convert first packetized traffic into a carrier file and write the carrier file to the second storage node. The second exchange server is configured to read the carrier file from the second storage node and convert the carrier file into second packetized traffic.

5 Claims, 29 Drawing Sheets

Related U.S. Application Data filed on Apr. 26, 2016, provisional application No. 62/327,911, filed on Apr. 26, 2016.

(51) Int. Cl.
  *G06F 15/173* (2006.01)
  *H04L 29/08* (2006.01)
  *H04W 88/14* (2009.01)

(52) U.S. Cl.
  CPC ...... *H04L 67/1097* (2013.01); *H04L 67/2842* (2013.01); *H04L 67/2876* (2013.01); *H04L 67/322* (2013.01); *H04W 88/14* (2013.01)

(56) References Cited

U.S. PATENT DOCUMENTS

| | | |
|---|---|---|
| 6,463,465 B1 | 10/2002 | Nieuwejaar |
| 7,389,312 B2 | 6/2008 | Ohran |
| 7,633,909 B1 | 12/2009 | Jones et al. |
| 7,689,722 B1 | 3/2010 | Timms et al. |
| 7,930,339 B2 | 4/2011 | Tobita et al. |
| 8,107,363 B1 | 1/2012 | Saluja |
| 8,611,355 B1 | 12/2013 | Sella et al. |
| 8,966,075 B1 | 2/2015 | Chickering et al. |
| 9,110,820 B1 | 8/2015 | Bent et al. |
| 9,164,702 B1 | 10/2015 | Nesbit et al. |
| 9,213,594 B2 | 12/2015 | Strasser et al. |
| 9,277,452 B1 | 3/2016 | Aithal et al. |
| 9,298,719 B2 | 3/2016 | Noronha et al. |
| 9,641,612 B2 | 5/2017 | Yu |
| 2002/0046253 A1 | 4/2002 | Uchida et al. |
| 2003/0110214 A1 | 6/2003 | Sato |
| 2003/0147403 A1 | 8/2003 | Border et al. |
| 2004/0205339 A1 | 10/2004 | Medin |
| 2005/0235352 A1 | 10/2005 | Staats et al. |
| 2006/0195896 A1 | 8/2006 | Fulp et al. |
| 2007/0168517 A1 | 7/2007 | Weller et al. |
| 2008/0117927 A1 | 5/2008 | Donhauser et al. |
| 2008/0247386 A1 | 10/2008 | Wildfeuer |
| 2009/0003223 A1 | 1/2009 | McCallum et al. |
| 2009/0092043 A1 | 4/2009 | Lapuh et al. |
| 2009/0106569 A1 | 4/2009 | Roh et al. |
| 2009/0129386 A1 | 5/2009 | Rune |
| 2009/0217109 A1 | 8/2009 | Sekaran et al. |
| 2009/0259798 A1 | 10/2009 | Wang et al. |
| 2010/0325309 A1 | 12/2010 | Cicic et al. |
| 2011/0007652 A1 | 1/2011 | Bai |
| 2011/0231917 A1 | 9/2011 | Chaturvedi et al. |
| 2011/0268435 A1 | 11/2011 | Mizutani et al. |
| 2012/0005264 A1 | 1/2012 | McWhirter et al. |
| 2012/0082057 A1 | 4/2012 | Welin et al. |
| 2012/0105637 A1 | 5/2012 | Yousefi et al. |
| 2012/0188867 A1 | 7/2012 | Fiorone et al. |
| 2012/0210417 A1 | 8/2012 | Shieh |
| 2012/0270580 A1 | 10/2012 | Anisimov et al. |
| 2013/0110787 A1 | 5/2013 | Garimella et al. |
| 2013/0283118 A1 | 10/2013 | Rayner |
| 2013/0286835 A1 | 10/2013 | Plamondon et al. |
| 2013/0287037 A1 | 10/2013 | Bush et al. |
| 2013/0318233 A1 | 11/2013 | Biswas et al. |
| 2013/0322255 A1 | 12/2013 | Dillon |
| 2013/0343180 A1 | 12/2013 | Kini et al. |
| 2014/0210693 A1 | 7/2014 | Bhamidipati et al. |
| 2014/0250066 A1 | 9/2014 | Calkowski et al. |
| 2014/0269712 A1 | 9/2014 | Kidambi |
| 2014/0341023 A1 | 11/2014 | Kim et al. |
| 2014/0359704 A1 | 12/2014 | Chen |
| 2014/0369230 A1 | 12/2014 | Nallur |
| 2015/0063117 A1 | 3/2015 | DiBurro et al. |
| 2015/0063360 A1 | 3/2015 | Thakkar et al. |
| 2015/0089582 A1 | 3/2015 | Dilley et al. |
| 2015/0095384 A1 | 4/2015 | Antony et al. |
| 2015/0128246 A1 | 5/2015 | Feghali et al. |
| 2015/0271104 A1 | 9/2015 | Chikkamath et al. |
| 2015/0281176 A1 | 10/2015 | Banfield |
| 2015/0326588 A1 | 11/2015 | Vissamsetty et al. |
| 2016/0006695 A1 | 1/2016 | Prodoehl et al. |
| 2016/0077745 A1 | 3/2016 | Patel et al. |
| 2016/0134543 A1 | 5/2016 | Zhang et al. |
| 2016/0165463 A1 | 6/2016 | Zhang |
| 2016/0337223 A1 | 11/2016 | MacKay |
| 2016/0337484 A1 | 11/2016 | Tola |

FOREIGN PATENT DOCUMENTS

| | | |
|---|---|---|
| CN | 101969414 A | 2/2011 |
| CN | 102340538 A | 2/2012 |
| CN | 102457539 A | 5/2012 |
| CN | 103118089 A | 5/2013 |
| EP | 1635253 A2 | 3/2006 |
| WO | WO-02/33551 A1 | 4/2002 |
| WO | WO-2006/055838 A2 | 5/2006 |
| WO | WO-2010/072030 A1 | 7/2010 |
| WO | WO-2013/120069 A1 | 8/2013 |
| WO | WO-2015/021343 A1 | 2/2015 |
| WO | WO-2016/094291 A1 | 6/2016 |
| WO | WO-2016/110785 A1 | 7/2016 |
| WO | WO-2016/123293 A1 | 8/2016 |
| WO | WO-2016/162748 A1 | 10/2016 |
| WO | WO-2016/162749 A1 | 10/2016 |
| WO | WO-2016/164612 A1 | 10/2016 |
| WO | WO-2016/198961 A2 | 12/2016 |

OTHER PUBLICATIONS

Soroush Haeri, Qingye Ding, Zhida Li, and Ljiljana Trajkovic, "Global REsource Capacity Algorithm with Path Splitting for Virtual Network Embedding", 2016 IEEE, pp. 666-669. (Year: 2016).*

N.M. Mosharaf Kabir Chowdhury, Muntasir Raihan Rahman, and Raouf Boutaba, "Virtual Network Embedding with Coordinated Node and Link Mapping", IEEE Communications Society Subject Matter Experts for Publication in the IEEE INFOCOM 2009, pp. 783-791. (Year: 2009).*

"Operations and Quality of Service Telegraph Services, Global Virtual Network Service," ITU-T Standard, International Telecommunication Union, Geneva, Switzerland, No. F.16, Feb. 21, 1995 (23 pages).

Robert Russell, "Introduction to RDMA Programming," Copyright 2012, retrieved from the Internet: URL:web.archive.org/web/20140417205540/http://www.cs.unh.edu/~rdr/rdma-intro-module.ppt (76 pages).

* cited by examiner

NETWORK SLINGHOP VIA TAPESTRY SLINGSHOT

RELATED APPLICATIONS

This application is a U.S. National Stage application under 35 U.S.C. § 371 of International Patent Application No. PCT/IB2017/000613, which claims the benefit of and priority to U.S. Provisional Application No. 62/327,907, filed on Apr. 26, 2016, U.S. Provisional Application No. 62/327,846, filed on Apr. 26, 2016 and U.S. Provisional Application No. 62/327,911, filed on Apr. 26, 2016. The entire contents of each of these applications are incorporated herein by reference.

This application also relates to the following applications, content of which are hereby incorporated by reference: International Patent Application Nos., PCT/IB16/01867, filed on Dec. 9, 2016; PCT/US15/64242, filed on Dec. 7, 2015; PCT/IB16/00110, filed on Jan. 5, 2016; PCT/US16/15278, filed on Jan. 28, 2016; PCT/IB16/00528, filed on Apr. 7, 2016; PCT/IB16/00531, filed on Apr. 7, 2016; PCT/US16/26489, filed on Apr. 7, 2016; PCT/IB16/01161, filed on Jun. 13, 2016.

BACKGROUND OF THE INVENTION

Technical Field

The present disclosure relates generally to networks and more particularly to a framework which harnesses the power of Slingshot advanced transport into a transparent, optimized Slinghop segment within a regular internet path.

BACKGROUND

One of the greatest advantages offered by current internet technologies is that they adhere to standards enabling interoperability and communication between devices from various vendors. The base technology of Ethernet and the internet protocol (IP) predicated on top of it utilize the sending of packets across segments between IP addresses as hops. These packets are vendor agnostic meaning that they do not need to know or care about who made the gear that they pass through and so long as the gear can understand the packet's structure and can parse its headers and footers, the packet can be delivered.

Slinghop allows the benefits of slingshot (see U.S. Provisional Patent No. 62/266,060 and PCT/IB16/01867) to be seamlessly utilized for the long-haul portion of transport while also allowing clients to use their existing equipment, configurations, and workflows.

Slinghop can be stand-alone built on top of slingshot or it can be integrated with a global virtual network (GVN) or some other network framework. When mention is made of a sling node (SLN), this can refer to a super computer cluster or node, a high-performance computer or cluster, or other powerful computing system.

The two most common communications protocols on the internet are Transmission Control Protocol (TCP) and User Datagram Protocol (UDP) over IP which are respectively abbreviated as TCP/IP and UPD/IP. The protocol TCP/IP offers a reliable round-trip transmission due to transfer control based on window size and round-trip time (RTT), built-in error correction, verification of the integrity of transmitted data via an acknowledgement packet (ACK) returned to sender, and other features; however, this reliability comes at a cost as TCP/IP is significantly slower than UDP/IP. While UDP/IP is relatively faster because it is one-way transfer with no ACK sent returned to sender, verification of data integrity is not done and therefore loss or corruption at the receiver side isn't discoverable by the sender. And any packets lost en-route via UPD/IP are completely unknown to the receiver. The major tradeoff of TCP/IP over UDP/IP is accuracy versus raw speed.

While the most widely utilized protocols used on the internet are TCP/IP and UDP/IP over Ethernet, Ethernet itself has various versions from the original Ethernet to GigE, 10 GigE, 40 GigE, and 100 GigE Ethernet is available, with of course higher bandwidth versions expected in the future.

Among other methods, hosts are "found" by other hosts through modern routing using IP addresses and they can also be found via a domain name system which translates domain names to IP addresses. Routing protocols and route publishing help devices to determine IP path(s) between devices.

Over a long distance the protocols of TCP/IP and UDP/IP over Ethernet present certain challenges. Various techniques have been developed to try to force data to flow through the best path which include OSPF (open shortest path first), BGP routing (Border Gate Protocol) and other peering related technologies.

The internet is an open network of networks that peer with each other either directly or via peering with third party networks. There is very little control over the flow of traffic through the networks of the third parties in the middle. For those who demand higher quality of service (QoS) and have stringent performance requirements, dedicated lines, and related technologies like MPLS (Multiprotocol Label Switching), Dark Fiber, and other options offer direct connectivity between points with guaranteed QoS, mitigation against congestion from others' traffic, and other assurances, albeit at a comparably higher monetary cost (CAPEX and recurring running costs) over that of regular internet connectivity.

WAN Optimization is another technology used by some parties to improve connectivity. A WAN Optimization device's hardware and software work to compress and optimize the data transmitted between two internet-edge points of the WAN so that they can more efficiently push data through that link.

A Global Virtual Network (GVN) (see International Patent Application No. PCT/US16/15278) holistically optimizes system wide connectivity between connected devices thereby significantly improving network performance by, among other technologies, utilizing artificial intelligence (AI) and advanced smart routing (ASR).

All of the above technologies adhere to the current communications methodology for transmission of data as packets between origin to destination with round-trip back to origin and transmission times reflected as a measure of Round Trip Time (RTT).

Infiniband (IB) over distance is another option with the positioning of two end-point InfiniBand-enabled devices at either end of a dark fiber pathway to realize long distance IB connectivity. There are other protocols such as Fiberchannel but at this time, it is not reliable over distance.

Slingshot one-way sending (See U.S. Provisional Patent No. US 62/266,060 and International Patent Application No. PCT/IB16/01867) offers certain advantages to the movement of data at near wire-speed, by one-way sending of data to be written via remote direct memory access (RDMA) to a parallel file system (PFS), a RAM drive, hierarchical file system (HFS), or other storage or queue. This written data is read by the sling node (SLN) in the remote region to be used there. Slingshot can operate over an IB over distance link or a high speed Ethernet link which can support RDMA and other properties, or over another protocol.

Sling route is an extensible layer built on top of sling shot to permit rational and clear routing to multiple points via sling route addresses. The present invention is built upon Slingshot technology, and may also utilize GVN, sling route, and other technologies.

Beacon Pulser is another technology built upon slingshot (see U.S. Provisional Patent Application No. 62/266,060) and is utilized for the one-way broadcast sending of data.

As a further illustration of background, the rules of physics act as a foundation for references made herein to time, latency, wire speed, and other time dependent measures. As time and distance are significant, this invention uses the following baseline for time and distance/time references: distances herein are measured in miles under the imperial system; measures of distance herein can be a number with or without commas, and/or decimals or expressed as an integer; one exception for distances herein which do not use the imperial system is in the Refractive Index of Fiber Optic Cables where the distances are expressed in meters under the metric system; time is measured in seconds, expressed as integers, fractions and/or decimals of seconds (for example, the granularity of a tick of time can be measured either as a fraction (Every $\frac{1}{20}^{th}$ or $\frac{1}{10}^{th}$ or $\frac{1}{100}^{th}$) or as decimals (0.05, 0.1, 0.01) of a millisecond.); time units referenced herein may also be finer granularity than seconds, such as milliseconds (ms) and microseconds (μs), nanoseconds (ns), or other; any granularity finer than microseconds such as nanoseconds (ns) may be important in certain practical applications of this invention but for sake of demonstration, finest practical granularity herein is μs.

In computing, the most common measure of time for networking is milliseconds (ms) and for processing is microseconds (μs) or smaller.

The following table illustrates some possible values and their corresponding equivalent conversion.

TABLE 1 measures of time:

| # | Description | Seconds | Milliseconds (ms) | Microseconds (μs) |
|---|---|---|---|---|
| 1 | 1/10th of a second | 0.10000 | 100 | 100,000 |
| 2 | 1/20th of a second | 0.05000 | 50 | 50,000 |
| 3 | 1/100th of a second | 0.01000 | 10 | 10,000 |
| 4 | 10 microseconds | 0.00001 | 0.010 | 10 |
| 5 | 100 microseconds | 0.00010 | 0.100 | 100 |
| 6 | 1,000 microseconds | 0.00100 | 1.000 | 1,000 |

At the core of slingshot, Slinghop, and related sling technologies, synchronization of some interdependent or sequential or other interval based actions are reliant on an active focus on the granularity of a tick (see U.S. Provisional Patent Application No. 62/296,257 and/or International Patent Application No. PCT/IB 16/01867).

The inherent problems of internet protocol (IP) are acutely evident with TCP/IP and UDP/IP protocols over long distance. In addition to distance related issues, congestion through devices is another leading cause of packet loss, and other problems. TCP/IP has mechanisms to resend lost or dropped or corrupted packets. However, during times of congestion due to over-use, malfunction or other cause, the devices detecting loss will keep resending lost packets which can trigger a cascading effect that can accentuate the problem causing even more congestion.

Peering and the weaving together of many different segment characteristics along a network path can have an adverse effect on the QoS for the flow of traffic across the entirety of that path.

From a user experience (UX) and/or application performance perspective, high latency due to long paths, inefficient routing, congestion, loss, and other issues can cause services to cease functioning, result in application timeouts, and other present other adverse effects.

Internet Protocol (IP) over Ethernet becomes extremely inefficient over long distances and its utility decreases when there is congestion, poor routing, or the presence of other events.

Physical limitations of a line also present challenges. Due to the laws of physics, transmission of light over fiber optic lines cannot reach the speed that light can achieve in a vacuum.

TABLE 2 fiber line speed taking into account drag on optical fiber latency due to refraction (Based on data found on site: http://www.m2optics.com/blog/bid/70587/Calculating-Optical-Fiber-Latency)

| | miles/second in a vacuum | miles/second through fiber | fiber efficiency |
|---|---|---|---|
| Speed of light | 186,282.34 | 126,759.88 | 68.05% |

The above table compares the speed of light in a vacuum to the speed of light inside of the glass core of an optical fiber. Accordingly, there is a physical limitation to fiber efficiency which establishes a baseline for the theoretical best speed that can be achieved for light to travel through fiber.

While the Refractive Index of fiber optic cables may vary slightly, an average is assumed as follows: Average of approximately 203 m to 204 m/μs versus the speed of light of 299.792 m/μs for an average efficiency of 68.05%.

Therefore, transmission speed over fiber is 126,759.88 miles per second and as such is the fastest possible wire-speed which can be achieved.

The Request-Response nature of host to host round-trip transmission on today's internet (and corresponding RTT measurements of elapsed time) requires one host to query another host for information to be returned. Accordingly, host to host communication and drag over extended paths creates inefficiencies.

The packetization of data traffic also leads to inefficiencies. Packet size limits require data messages to be split into multiple packets when the size of the message data in bytes exceeds the number of bytes allowed per the packet's data payload. There is also significant bloat added by headers (and possibly footers) at each of the various levels of the IP model (see FIG. 3) or OSI model (see FIG. 4) significantly impacting the payload size in bytes.

The maximum transmission unit (MTU) specifies the maximum number of eight bit bytes that can be sent as a packet or frame. For example, if a packet has an MTU of 1,500, that means combined headers and footers from all levels plus the payload cannot exceed that total. Minimum MTU is 68. And the most common TCP MTU on the internet is currently a value of 1500 or 576. Working backwards, one can calculate the size of the largest allowed payload size in bytes by taking MTU and subtracting combined header and footer bytes, and other bloat to determine the remainder bytes available for the payload data bytes.

When a file size is larger than the allowed size of the data payload, then it is sent as a multi-part message. This entails the splitting of the file into pieces with more headers/footers injected denoting the start and end of each piece of the file within the allowed size of the already constrained data payload. This bloat within bloat is acute when a large file is to be sent over a large distance.

TCP/IP and UDP/IP are subject to internet protocol (IP) over Ethernet's store & forward model of handling packets through each device. This means that for every hop across devices, a packet must be received in full, checked for completeness and then forwarded onwards. While this process only takes approximately 100 µs per hop, the longer the path and more hops through which the packet must transit in each direction, the longer the RTT time. It is conceivable for a packet to have to transit through 15 or 20 hops in each direction therefore adding 2*15*100 µs=3,000 µs to 2*20*100 µs=4,000 µs. This means that there is a 3 ms to 4 ms increase in transmission time due to packets transiting devices at hops. Further, if there is congestion, it can take significantly longer for devices to manage packet transfers.

Routing, paths, peering issues, and fabric related problems over many network segments pose problems as boundaries are crossed between various network fabrics. Dedicated lines are point to point and while most are optimal, they are closed and therefore not subject to the same congestion issues. Considering protocol, they are still Request/Response and are therefore still exposed to the above protocol limitations, which are amplified over distance.

While Slingshot is a novel approach to solve many of the above problems, it is expensive for a single user to employ on their own from both a CAPEX perspective as well as from an ongoing operational perspective. In many cases, Slingshot requires a framework to be built upon it. In some cases, such as data conveyance utilization by financial firms, the expense and effort is justified. Many other industries however cannot afford nor do they have the need for a dedicated slingshot mechanism.

An information Beacon Pulser utilizing slingshot to transmit a stream or multi-cast data is good for one-way conveyance of information such as the relaying of market information over distance. However, it is ill-suited for integration into an internet path where recipient sends a response back.

SUMMARY

In accordance with the disclosed subject matter, systems and methods are provided for a framework which harnesses the power of Slingshot advanced transport into a transparent, optimized Slinghop segment within a regular internet path.

The invention of Slinghop is a technology to harness the power of slingshot transparently as a segment situated within a pair of hops in a path of regular IP hops. The Slinghop is the one or more segment(s) over long distance offering fast transport vs native internet transport. The Slinghop is powered by a framework consisting of two slingshots with one sending data by slingshot from one region to the destination region and another slingshot sending information from destination region back to the origin region.

At entry point, the Slinghop captures and buffers received packets into a queue. At variable periods of time cycles governed by Granularity of a Tick, the received packets accumulated in the queue's buffer are combined into the file data section of a bulk, uncompressed carrier file. This combined file is Slingshot to the opposing end of the Slinghop by saving it in a folder on a PFS device where it is read by a sling node (SLN). Per the time cycle governed by the granularity of a tick of time on that SLN, the carrier file is read from the PFS there and uncombined and used as follows; The individual packets are individualized and returned to their journey by transmission to the next hop, sending them on their way. As far as the next hop on the IP path is concerned, it sees that it has received the packet from an equivalent IP device.

Routing between pairs of Slinghop entry/exit IP addresses is based on the slingshotting of packets to PFS devices in the destination region. See FIGS. 12, 16, and 17. The route to target region is based on to which PFS device the carrier file containing packets is sent.

The Slinghop further offers complete integration and interoperability with legacy systems running IP over Ethernet because the IP address pairing indicate the entry and exit points of the Slinghop. From the perspective of the IP devices, these two addresses appear to be standard IP hops at either end of an IP network segment and the underlying Slinghop operation is transparent to them.

Sling nodes (SLN) are a feature of Slinghop. They can be super computer nodes (SCN), high performance computers/clusters (HPC) operating together, or other systems which may operate independently or as a group all at an underlying level and operating based on their relative, contextual role and in unison from a holistic functionality perspective.

Slingshot is a second degree under-the-internet (UTI squared or UTI$^2$) layer. See FIG. 5 for a more thorough description.

In some embodiments, the present invention allows for the speed, power, and the advantages of Slingshot vs IP but as a transparent hop embedded within an IP path.

In some embodiments, the present invention features algorithmic analysis which can determine whether data will be faster via regular IP path or if Slinghop transmission can offer a speed gain in the form of lower latency (see FIG. 25).

In some embodiments, the present invention does not require any specific configuration by senders or receivers of traffic transiting the Slinghop transport path. It is therefore seamless with a corresponding automated speed advantage being realized over long distance hops in a segment path.

In some embodiments, the present invention is a reasonably scalable offering to send widespread, high volume, data achieving consistently high speed, high throughput due to its operating at near wire speed.

In some embodiments, the present invention does not have the same congestion and other issues as IP, and therefore Slinghop does not suffer the same inefficiencies over distance that IP does.

In some embodiments, the present invention replaces a large section of hops in the IP based chain of segments and in their place, it slingshots data using simplified global routing over the greatest distance.

In some embodiments, the present invention uses Slingshot "internals" which are protected both by a secure perimeter and by the nature of the protocol. Therefore, there is a security advantage as it is not possible to intercept, interfere with, and/or modify traffic through the Slinghop segment (see FIG. 2).

In some embodiments, the present invention presents efficient bidirectional convergence of traffic between one Slinghop (egress ingress point) EIP to another Slinghop EIP.

In some embodiments, the present invention offers a transparent segment in an IP path, and while packets are oblivious to the Slinghop in the middle, the result is that it achieves the lowest possible RTT while also lowering hop count.

In some embodiments, the present invention results in better speed and performance due to no degradation in efficiency over long distances as normally occurs with long distance IP transport.

In some embodiments, the present invention is low cost to users as the cost of infrastructure is spread and carried by many clients sharing the infrastructure.

In some embodiments, the present invention assuages the concerns of many organizations which have invested large amounts of money into infrastructure built upon internet protocol (IP) over Ethernet. Since they will be reluctant to deprecate their existing systems in favor of new ones due to cost as well as a requirement for interoperability with legacy systems, Slinghop offering a plug-in enhancement over long distances lets them use the bulk of their legacy systems.

In some embodiments, the present invention is a bi-directional blending of traditional network segments supercharged by Slinghop transparent segment(s) offering a boost where advantageous to do so.

In some embodiments, the present invention can be easily integrated into flexible, dynamic, secure, and intelligent structures.

In some embodiments, a network system for providing long haul network connection between endpoint devices is disclosed. The network system includes a first and a second endpoint devices, a first and a second exchange servers, a first access point server coupled between the first endpoint device and the first exchange server, a second access point server coupled between the second endpoint device and the second exchange server, a first storage node coupled between the first exchange server and the second exchange server, and a second storage node coupled between the first exchange server and the second exchange server. The first exchange server is configured to convert first packetized traffic into a carrier file and write the carrier file to the second storage node. The second exchange server is configured to read the carrier file from the second storage node and convert the carrier file into second packetized traffic. The first exchange server is configured to (1) convert first packetized traffic received from the first endpoint device, via the first access point server, into a carrier file, and (2) write the carrier file to the second storage node. The second exchange server is configured to (1) read the carrier file from the second storage node and (2) convert the carrier file into second packetized traffic, wherein the second packetized traffic is sent to the second end device via the second access point server.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be made to the accompanying drawings and descriptive matter in which there are illustrated preferred embodiments of the disclosed subject matter.

BRIEF DESCRIPTION OF DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

DETAILED DESCRIPTION

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods, and media that are within the scope of the disclosed subject matter.

Figure 1:
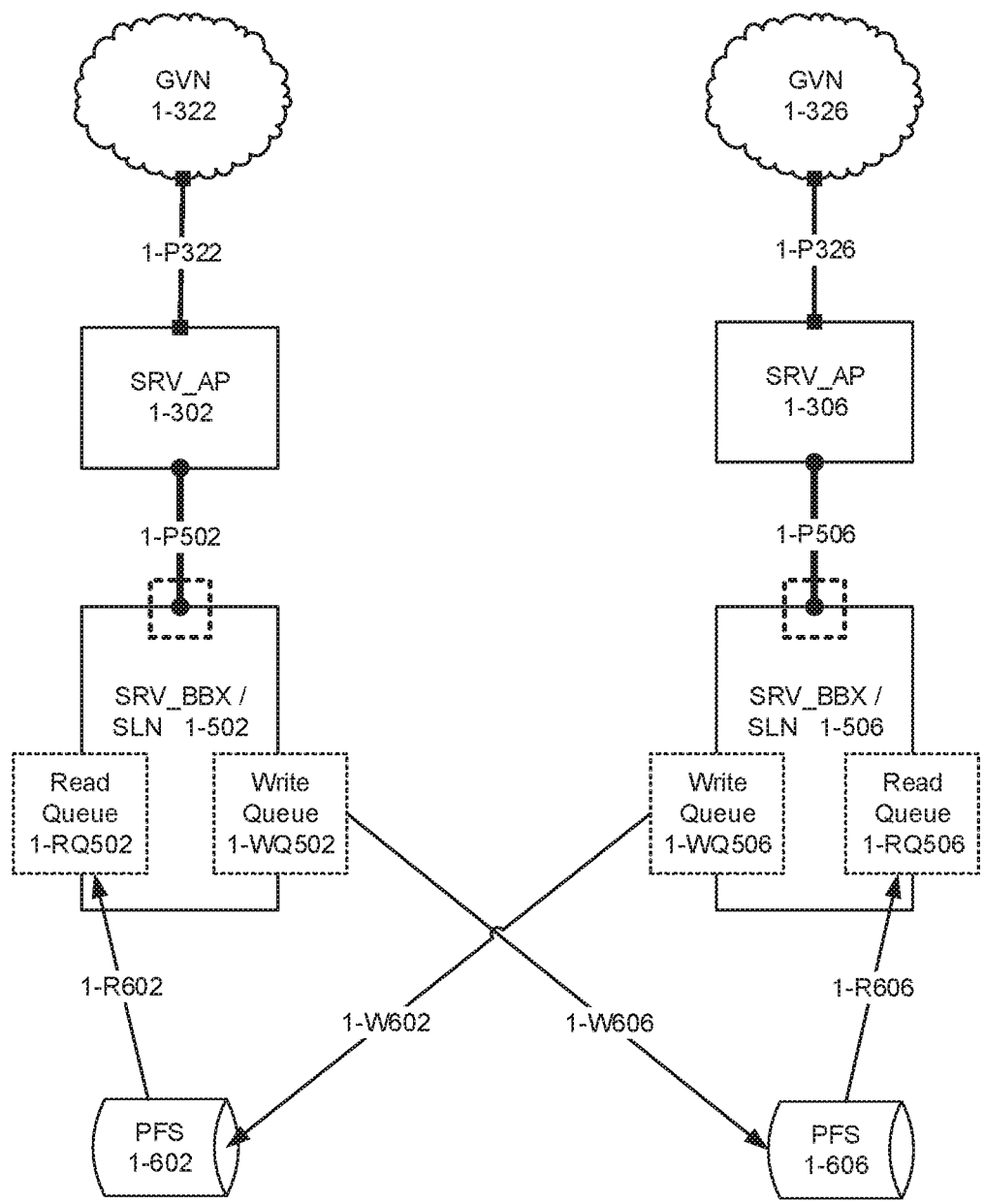
FIG. 1 illustrates the prior art of slingshot.

FIG. 1 illustrates two or more slingshot nodes working in unison to form the basis of Slinghop. This figure describes the prior art of slingshot, one way data transfer of any sized files via RDMA (1-W606 or 1-W602) writes directly to remote PFS devices respectively 1-606 and 1-602 in target regions by Write Queues 1-WQ502 and 1-WQ506. Files are accessed on PFS 1-606 or 1-602 by Read Queues 1-RQ506 and 1-RQ502 respectively. This figure demonstrates the operation of two independent slingshot mechanisms (see U.S. Provisional Patent Application No. 62/266,060 and International Patent Application PCT/IB16/01867) juxtaposed with each other and overlaid into an integrated relationship.

Traffic from GVN 1-322 to GVN 1-326 flows as follows. Traffic flows from GVN 1-322 to the access point server (SRV_AP) 1-302 via 1-P322 and onto backbone exchange server (SRV_BBX) 1-502. At this point, the slingshot mechanism on SRV_BBX/Sling node (SLN) 1-502 via its Write Queue 1-WQ502 function converts the packetized traffic into a combined carrier file and directly writes this carrier file via path 1-W606 to a folder on the parallel file system (PFS) storage node 1-606. The Read Queue 1-RQ-506 function of SRV_BBX SLN 1-506 retrieves the carrier file from the folder on PFS 1-606 and then it separates the carrier file back into individual packets which are sent to SRV_AP 1-306 via path 1-P506 and then onto the GVN 1-326 via 1-P326.

Traffic in the other direction flows from GVN 1-326 to GVN 1-322 following the pathway described as follows. Traffic flows to the access point server (SRV_AP) 1-306 via 1-P326 and onto backbone exchange server (SRV_BBX)/Sling node (SLN) 1-506. At this point, the slingshot mechanism on SRV_BBX SLN 1-506 via its Write Queue 1-WQ506 function converts the packetized traffic into a combined carrier file and directly writes this file via path 1-W602 to a folder on the parallel file system (PFS) storage node 1-602. The Read Queue 1-RQ-502 function of SRV_BBX 1-502 retrieves the carrier file from PFS 1-602 and then it separates the carrier file back into individual packets which are sent to SRV_AP 1-302 via path 1-P502 and then on to the GVN 1-322 via 1-P322.

A QoS setting can be integrated to allow for priority scheduling of traffic by writing to a specific folder versus another folder. The Read Queues can be configured to process files in one directory first and or it can also be set to check one folder more frequently than others in effect augmenting the priority of its contents.

Each one-way communication path is powered by Slingshot as defined in U.S. Provisional Patent Application No. 62/266,060 as noted above.

Together, these two nodes and their corresponding communication paths working in unison form the basis of the underlying Slinghop technology.

Figure 2:
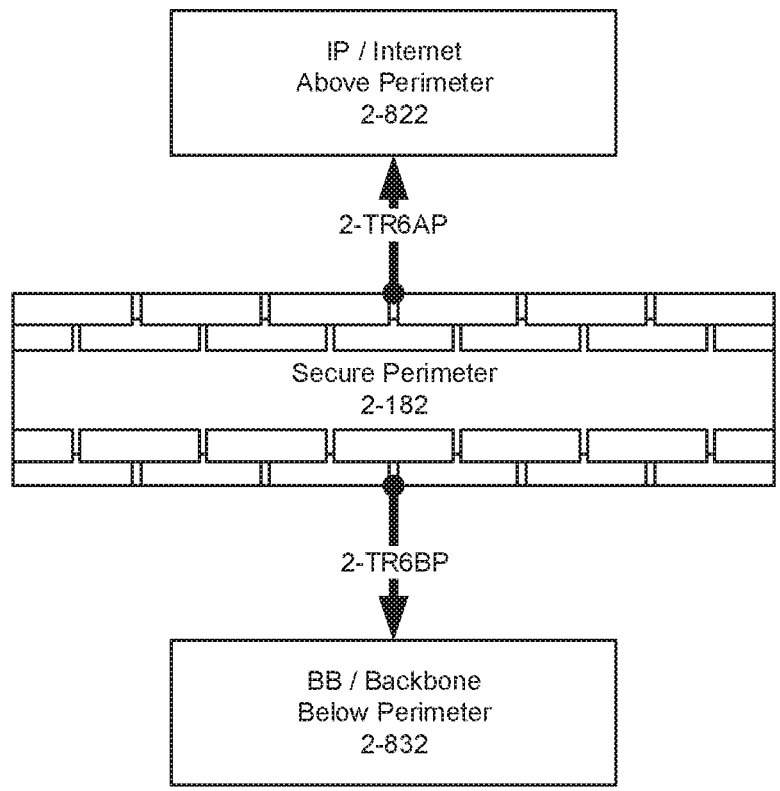
FIG. 2 illustrates secure perimeter with GVN above and sling infrastructure layer below.

FIG. 2 illustrates secure perimeter with GVN above and sling infrastructure layer below. This figure demonstrates the "air gap" between the internet 2-822 and the backbone 2-832 on top of which the slingshot protocol mechanism operates. Because of the difference in protocols and the nature of how sling operates there is a secure perimeter 2-182 between the two.

There exists a Secure Perimeter 2-182 which is between the IP/Internet layer 2-822 and the BB/Backbone layer 2-832. The Secure Perimeter 2-182 can function with firewall type operations to isolate the above layers from the layers below. Another built-in protection concerns the nature of the transport. Packets travel along path 2-TR6AP and files are written via RDMA to PFS devices via path 2-TR6BP. Files cannot natively move at the IP layer and packets cannot be individually routed via the BB layer.

Figure 3:
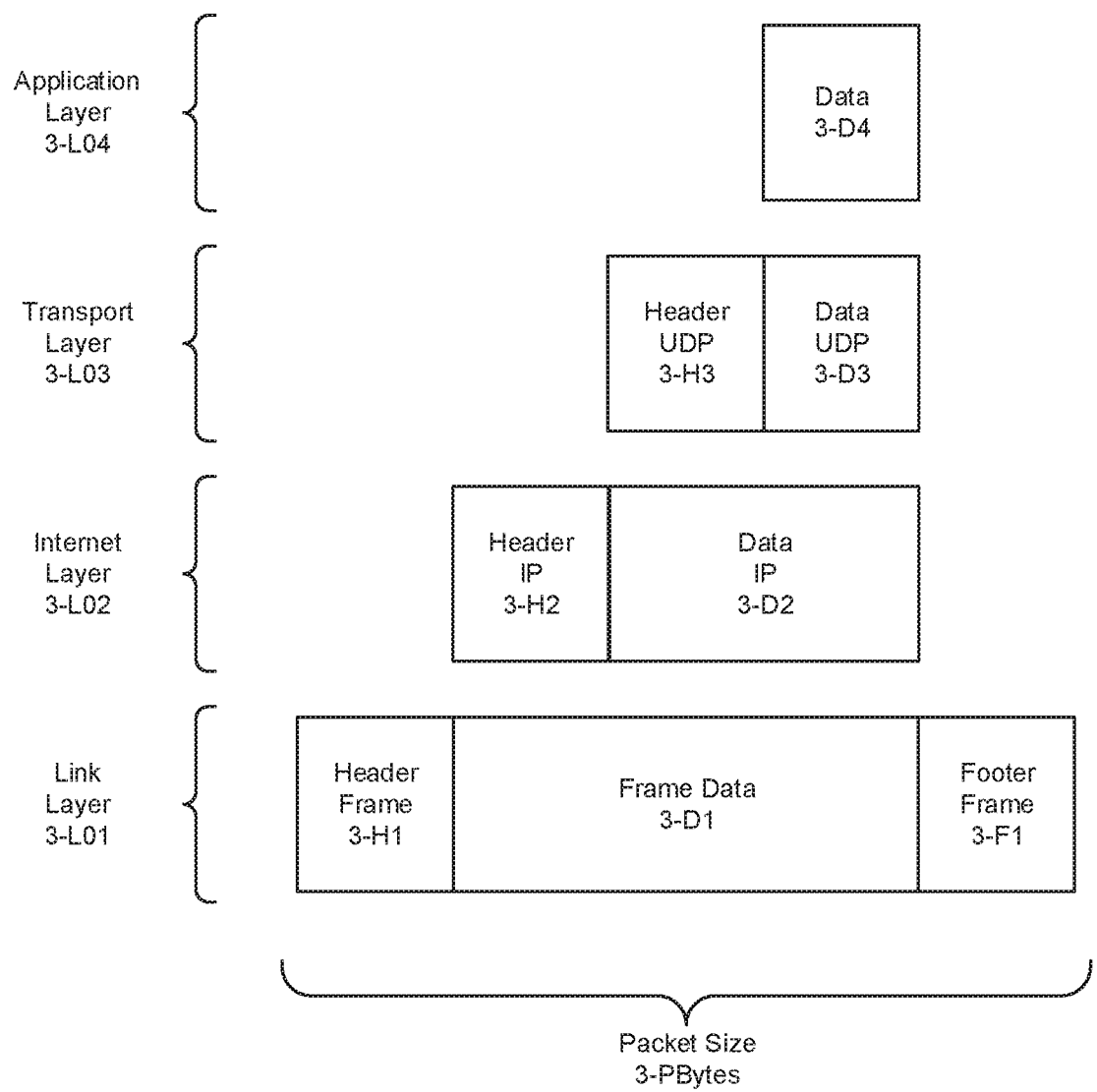
FIG. 3 illustrates the packet bloat in each layer of IP.

FIG. 3 describes the packet bloat for IP transport packets when headers are added to the data at various layers. At the Application Layer 3-L04, the data payload has an initial size as indicated by Data 3-D4. The size of the packet is indicated by Packet Size 3-PBytes.

At the next layer, Transport Layer 3-L03, the Packet Size 3-PBytes has the original size of the data 3-D4 which is equal to Data UDP 3-D3. It further includes bloat of Header UDP 3-H3.

At the next layer, Internet Layer 3-L02 and the body payload Data IP 3-D2 is a combination of 3-D3 and 3-H3. It increases 3-PBytes by Header IP 3-H2.

At the Link Layer 3-L01, Frame Data 3-D1 is a combination of 3-H2 and 3-D2. It further increases 3-PBytes by Header Frame 3-H1 and Footer Frame 3-F1.

Figure 4:
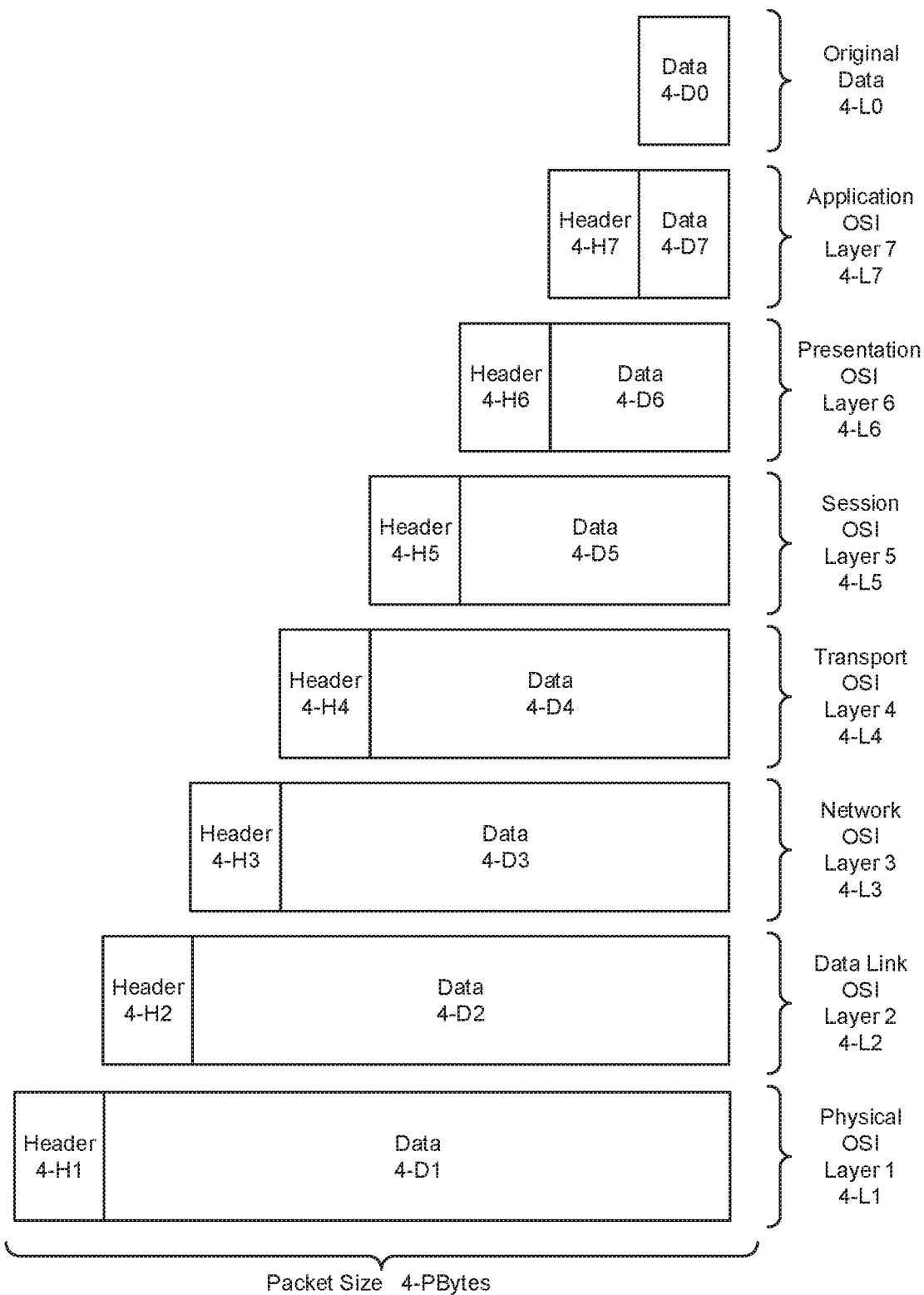
FIG. 4 illustrates the packet bloat in each layer of the Open Systems Interconnection (OSI) model.

FIG. 4 describes the packet bloat of data and headers at each of the seven layers of the OSI model. The original data 4-D0 grows at each level Application OSI Layer 7 4-L7 with the addition of headers such as Header 4-H7. At each subsequent layer down from layer 7 to layer 1, the data layer is a combination of the previous upper level's layer of Data and Header combined.

The total packet bloat in an OSI model at the Physical OSI Layer 14-L1 is denoted by Packet Size 4-PBytes.

Figure 5:
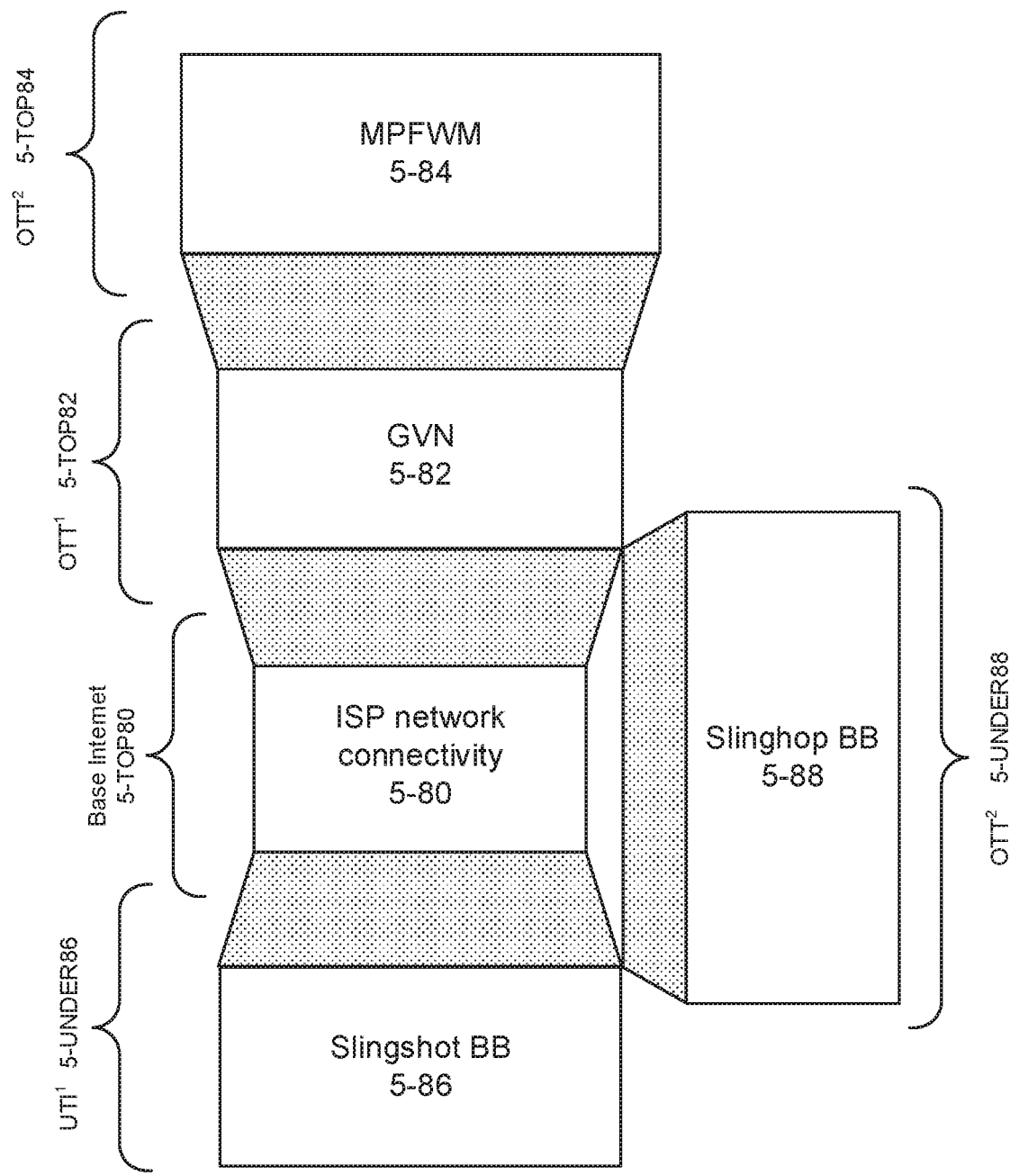
FIG. 5 illustrates bridging Layers under the Internet (UTI) mapped to Over the Top (OTT) layers.

FIG. 5 illustrates slinghop-bridging layers under the Internet (UTI) mapped to over the top (OTT) layers. This figure describes a visualization of how a GVN operates as a first degree overtop of the internet and how slingshot operates as a first degree under the internet layer. Slinghop is second degree under the internet and integrates as a segment in GVN path or in a regular internet path. FIG. 5 indicates the level where Slingshot BB5-86 fits into a topological hierarchy. $OTT^1$ indicates first degree over-the-top of the internet. $OTT^2$ indicates second degree over-the-top of the internet, meaning that it is over-the-top of an $OTT^1$ element. $UTI^1$ indicates first degree under-the-internet layer. $UTI^2$ indicates second degree under-the-internet layer which is below the $UTI^1$ element.

OTT and UTI are used for descriptive purposes only to indicate the layering of relationships and interactions. At the physical layer, all types of protocols may exist at the same level or various levels. GVN 5-82 is a global virtual internet at layer $OTT^1$ 5-TOP82 which is built upon the basic plumbing of the Base Internet 5-TOP80 which powers the ISP network connectivity 5-80.

The Slinghop BB 5-88 mechanism is a second degree UTI at layer $UTI^2$ 5-UNDER88. It utilizes the $UTI^1$ technology of Slingshot BB 5-86. The product of its functionality and corresponding advantages can be integrated into the flow of GVN 5-82 which is at layer $OTT^1$ 5-TOP82 or integrated as a segment in an internet path at level Base Internet 5-TOP80. The Slinghop therefore is a blended bridge of GVN and Slingshot.

An example of second degree OTT of MPFWM 5-84 at layer $OTT^2$ 5-TOP84 is noted for illustrative purposes only. In live implementations, it may or may not be integrated into the traffic flow.

Figure 6:
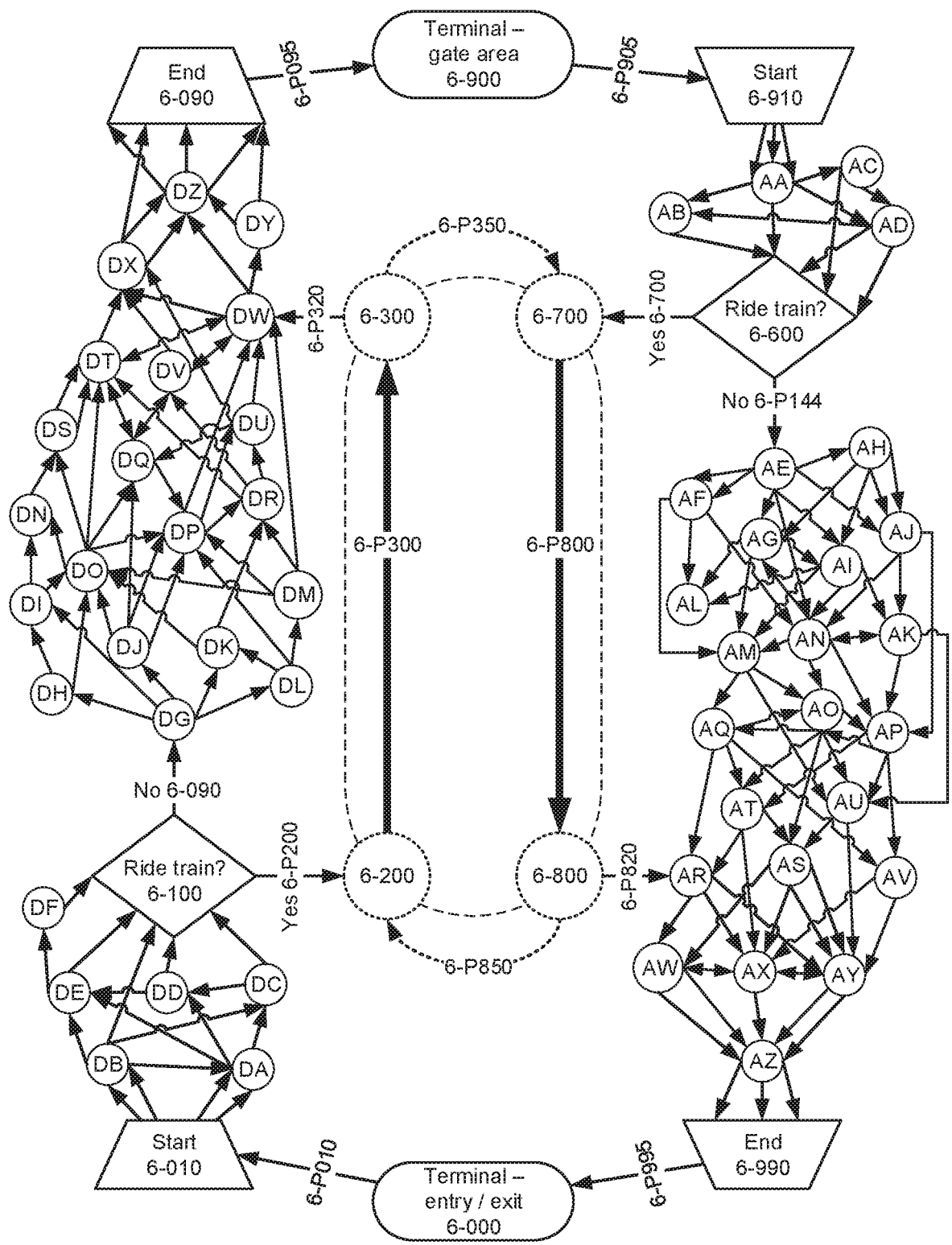
FIG. 6 visualizes the advantage of slingshot transport over the internet by comparing it to a train at the airport versus people walking a far distance to their gate

FIG. 6 visualizes the advantage of slingshot transport over the internet by comparing it to a train at the airport versus people walking a far distance to their gate. The walkers are prone to exhaustion and potential confusion or loss due to distance and complex routing taking an indeterminate amount of time to get from Start 6-010 or 6-910 to End 6-090 or 6-990. Those who opt to take the train have a short way to walk to get to the station and if they opt to ride the train at 6-P200 or 6-P700, then boarding and disembarking will add a certain amount of time at 6-200 and 6-300, or 6-700 and 6-800, but the travel on the train 6-P300 and 6-P800 is faster than walking, more direct, not prone to loss, and its travel time is determinate.

Particularly, FIG. 6 provides an analogy as a visual graphic comparing the paths that passengers may take through an airport if they walk from check-in 6-000 to terminal gate area 6-900 or the path if they take a train. They both start at 6-010 and may travel along hops on paths through points DA to DF and may either head directly to 6-100 or may meander. They can decide to take a train at 6-100. If they do so, via path Yes 6-P200, they board train at 6-200 and this train takes them directly and at high speed via path 6-P300 to 6-300 where they disembark via path 6-P320. From there, they enter the walking path again at DW and head via other path hops DX, DY, DZ to the boarding area at 6-090. Those that choose to walk via path No 6-090 will begin walking at DG and will most likely meander as they walk between various other hop points in their path until they too reach end 6-090. While embarkation and disembarkation of the train may add a bit of extra time, this is more than made up for in overall timesaving by the speedy nature of conveyance of the train. Those that take the train also experience less fatigue and potential stress as the walkers do.

The path from planes 6-900 to terminal exit 6-000 begins at start 6-910 and again offers choice of riding the train or walking with similar performance and time advantages enduring for those who opt to take the train. This is an analogy of the decision of whether to use Slinghop between long-distance points or to have packets travel along extended internet paths.

Figure 7:
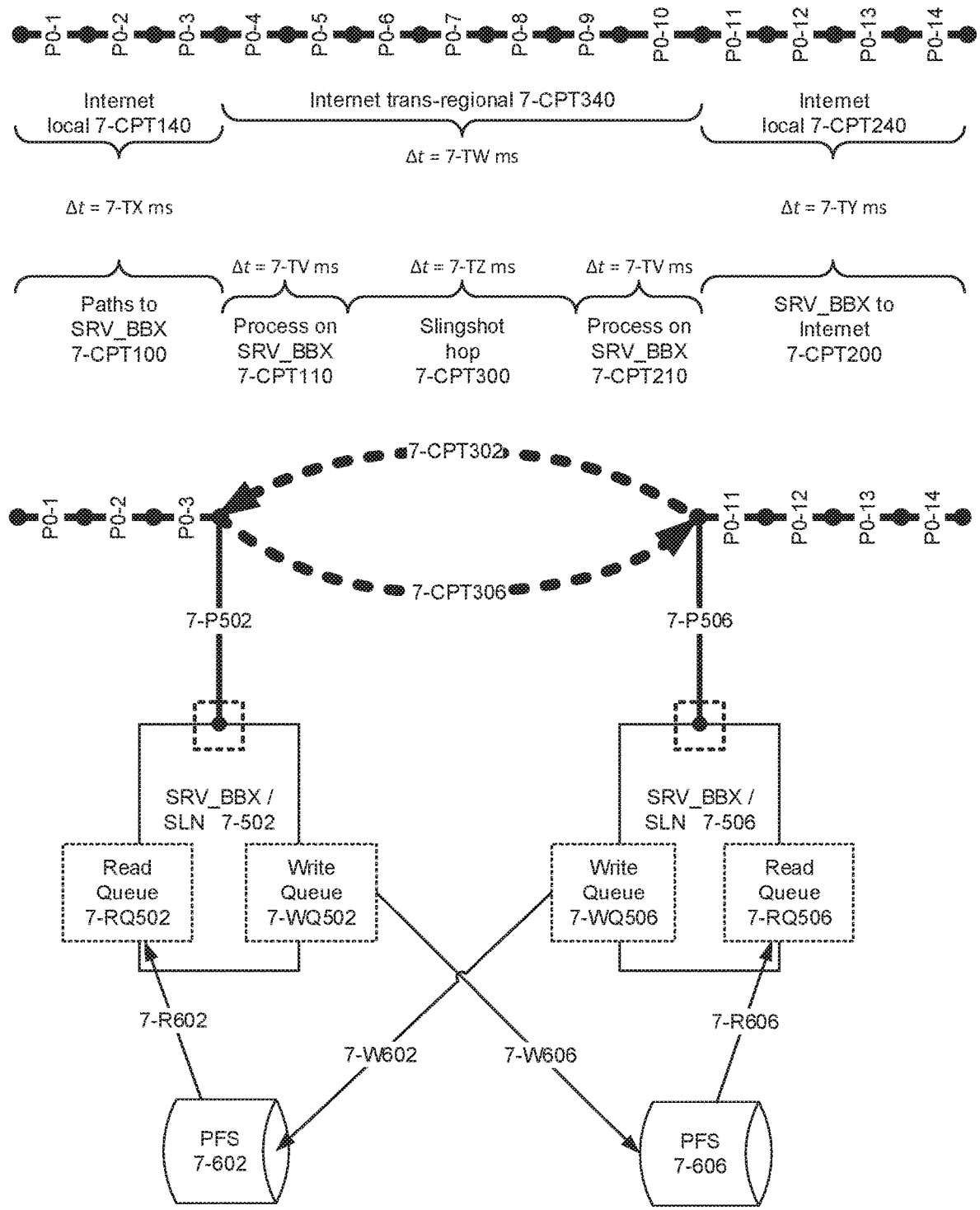
FIG. 7 illustrates how Slingshot integrates into an IP path as a Slinghop.

FIG. 7 illustrates how Slingshot integrates into an IP path as a Slinghop. It compares the internet trans-regional 7-CPT340 time of 7-TW ms with Slinghop timing of 7-TV+7-TZ+7TV for the processing at either end 7-CPT110 and 7-CTP-210 and the slingshot hop 7-CPT300. Slinghop is powered by Slingshot mechanism which is illustrated herein but as far as the clients are concerned, the hop begins at 7-P502 and ends at 7-P506, and the reciprocal of 7-P502 and 7-P506. The segment 7-CPT306 replaces P0-4 through P0-10 and 7-CPT302 replaces P0-10 through P0-4.

FIG. 7 builds upon the demonstration of the operation of Slinghop as described in FIG. 1 with the exception that access point servers (SRV_AP) are not noted nor are any devices other devices noted above the backbone exchange servers (SRV_BBX)/slingnodes (SLN) 7-502 and 7-506.

Path 7-P502 and 7-P506 link the Slinghop mechanism to end hop bridgehead of the segments P0-3 and P0-11 respectively. Two paths 7-CPT302 and 7-CPT306 between those end hops indicate each one-way Slingshot as described in FIG. 1. When combined into a Slinghop, these paths constitute a segment which appears to client data as just another segment in a chain.

At the top of FIG. 7, there is a non-Slinghop enabled path between an entry/exit point at the left of segment P-01 to another entry/exit point of the pathway at the right of segment P0-14.

Between the non-Slinghop and Slinghop enabled paths are bracket notations which denote sections of segments into blocks to compare the operations of Slinghop enabled paths to regular non-Slinghop internet paths.

A set of initial segment blocks at one end of each path are Internet local 7-CPT140 which compares with Paths to SRV_BBX/SLN 7-CPT100 and for this example each has the same Δt of X ms. The set of initial segment blocks at the other end of each path are Internet local 7-CPT240 which compares with Paths to SRV_BBX/SLN 7-CPT200. For this example, each have the same duration of time Δt of Y ms.

The middle segments are where the comparison can be made between Slinghop enabled and regular internet paths. The regular internet path duration of time for segment Internet trans-regional 7-CPT340 is Δt of W ms. The Slinghop enabled segment is the sum of a combination of three time durations Process on SRV_BBX/SLN 7-CPT110 with a Δt=+<1 ms plus Slingshot hop 7-CPT300 with a Δt=Z ms plus Process on SRV_BBX/SLN 7-CPT210 with a duration of Δt=+<1 ms. The rationale for the addition of the three time durations is to note not just the time and efficiency gained by the Slinghop over Slingshot hop 7-CPT300 but also to take into account the resistance due to processing time for Slinghop at either end. Even though there is additional time added for the processing of packets combined into files which are saved to remote PFS and then pulling of the files and breaking them back into packets, the key point is that the efficiency and speed gain from Slinghop will more than compensate for this with its relative end-to-end shorter duration of time in both directions.

Figure 8:
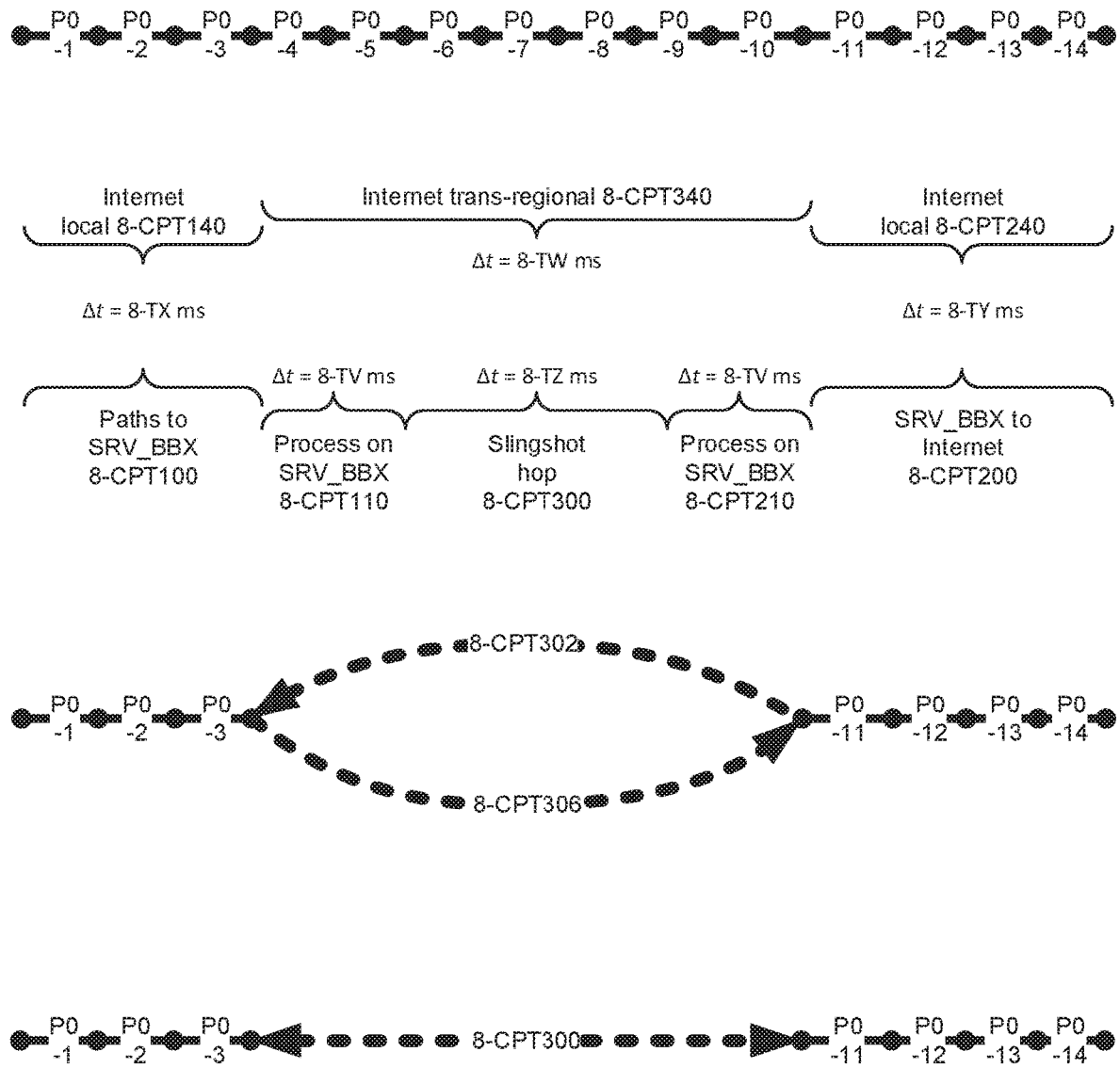
FIG. 8 illustrates the advantages of Slinghop integration into long haul paths.

FIG. 8 continues to demonstrate the advantages of Slinghop integration into long haul paths. Segment 8-CPT300 demonstrates how the Slinghop is a transparent and bidirectional segment. FIG. 8 is based on FIG. 7 with many of the same elements noted. The main difference between the figures is that the Slinghop mechanism as connected by paths 8-CPT302 and 8-CPT306 is hidden in FIG. 8.

A new pathway line of segments end-to-end is located at the bottom of this figure. Instead of two separate arrows 8-CPT302 and 8-CPT306 like on the middle line, the Slinghop segment is denoted by 8-CPT300.

When Slinghop enabled paths are compared with long distance transfers over the regular internet, the benefit from the speed of the transparent "middle" Slinghop compensates for the low added time at either marginal end of the Slinghop.

Figure 9:
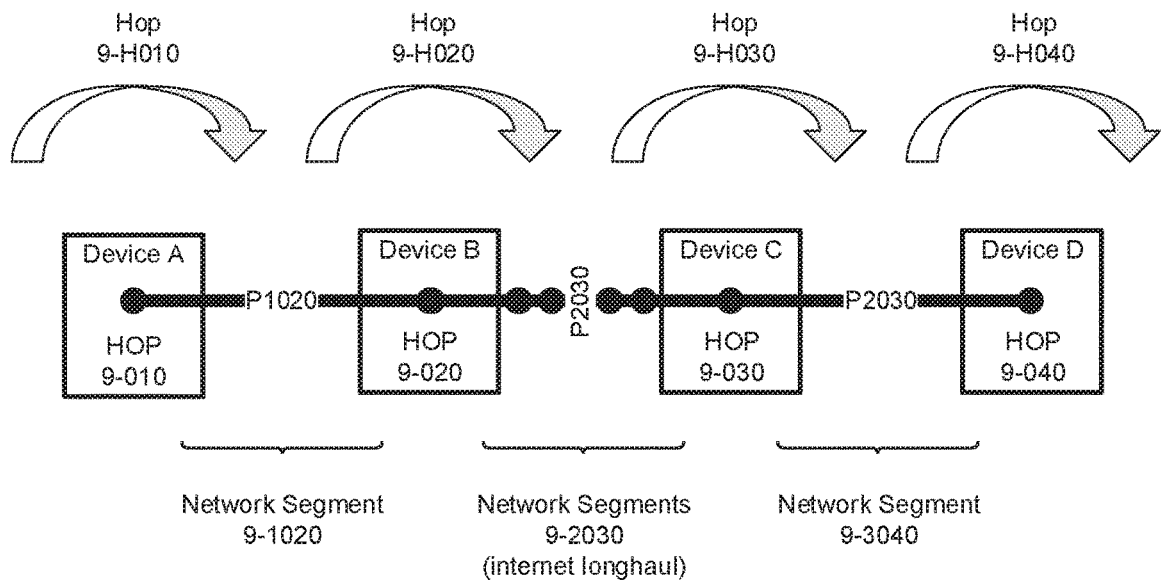
FIG. 9 illustrates Slinghop integration as a segment between two hops.
Figure 9:
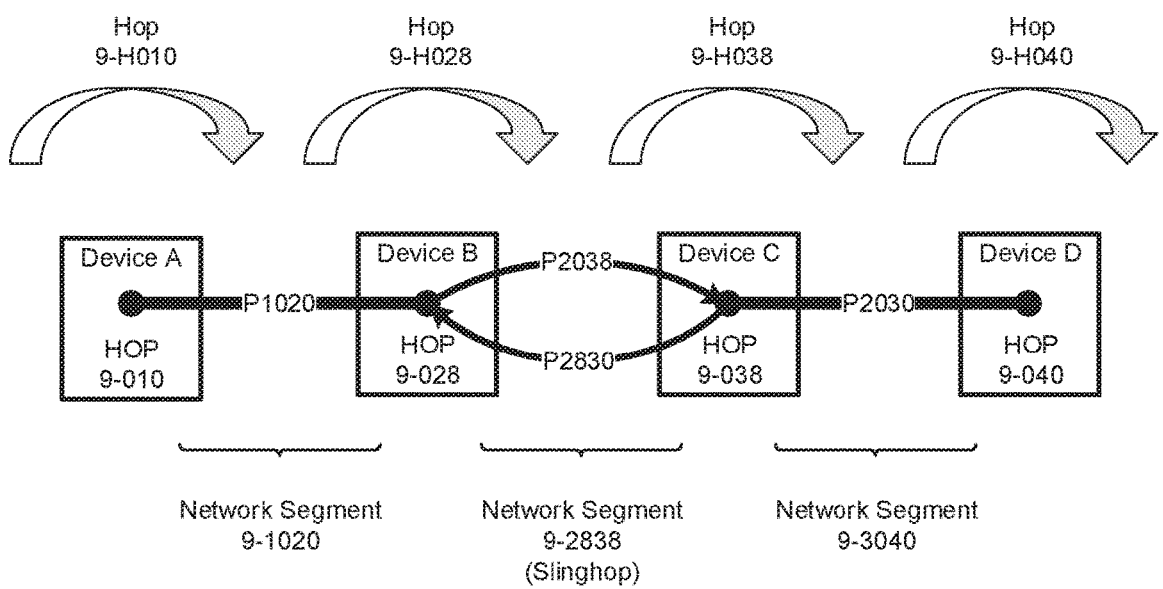

FIG. 9 illustrates a visual comparison between hops in two regions connected by either an internet long-haul network segment 9-2030 or those same regional hops connected by a Slinghop segment 9-2838. Device B 9-028 finds Device C 9-038 by its IP address even though the underlying transport over the long haul P2038 is via Slinghop powered by slingshot. Device C 9-038 finds Device B 9-028 by its address via path P2830.

Path P2030 represents many hops along the internet over a long distance—this figure is not drawn to scale. And Paths P2038 and P2830 together represent the bi-directional slingshot segments which together constitute a Slinghop over the long distance.

Over long distance, network Segment 9-2838 is significantly better performing and faster than internet longhaul network segment 9-2030.

Figure 10:
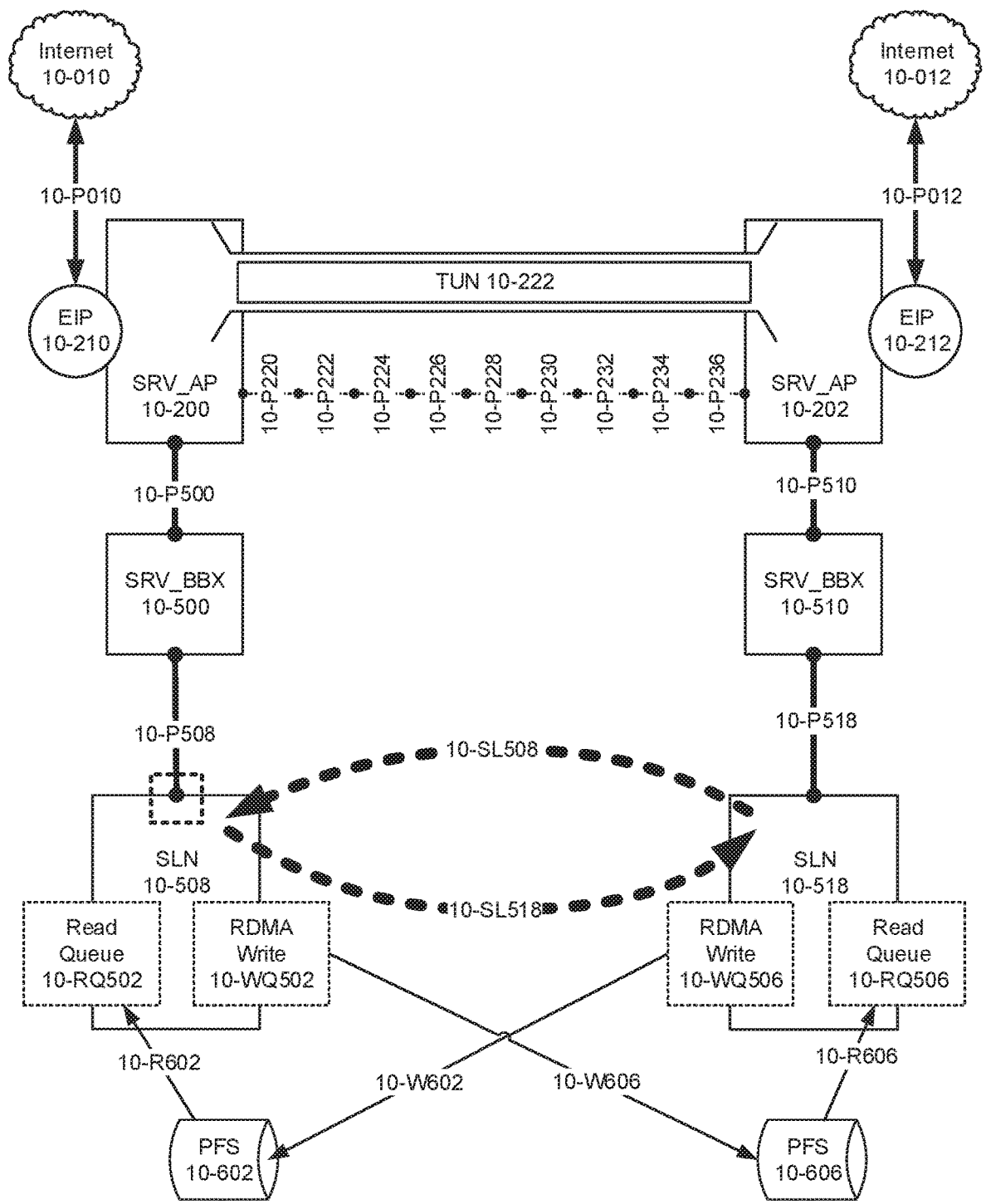
FIG. 10 illustrates three different network fabrics.

FIG. 10 demonstrates three different network fabrics: a GVN tunnel TUN 10-222 between SRV_AP 10-200 and SRV_AP 10-202; an internet path 10-P220 to 10-P236 over the open internet; a slingshot segment 10-SL518 between slingnodes SLN 10-508 and SLN 10-518 and the reciprocal 10-SL508 between SLN 10-518 and SLN 10-508. These three fabrics are combined in the GVN into a network tapestry.

The tunnel TUN 10-222 is over-the-top (OTT) of the internet and Slinghop utilizes reciprocal slingshot mechanisms over fiber back bone.

Algorithmic analysis can be applied to choose which transport type over which path is most optimal. This segment and path analysis can also be utilized to tweak various settings to realize best performance.

Figure 11:
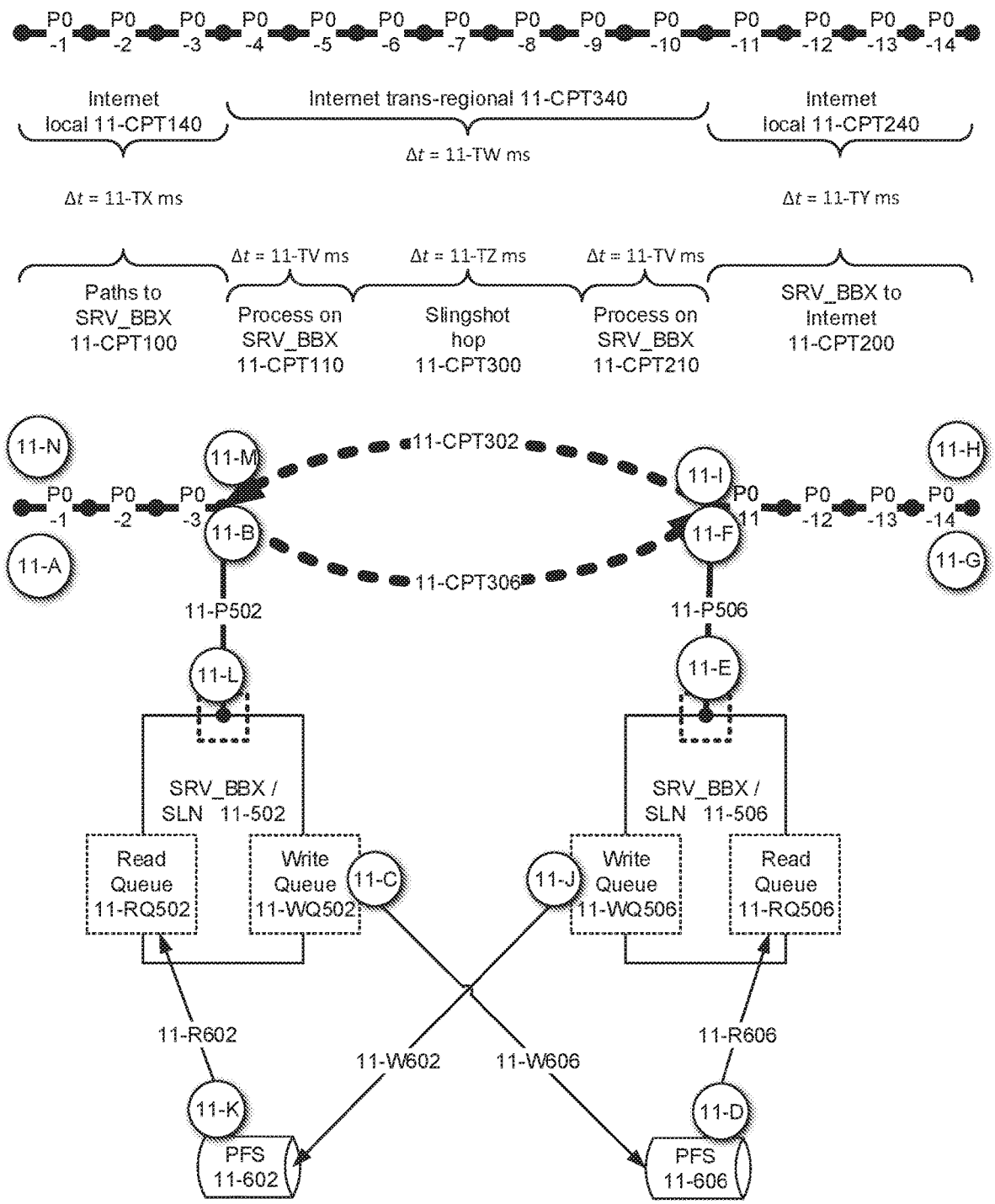
FIG. 11 illustrates the slingshot reciprocal paths into steps to describe each distinct operational parts of sling.

FIG. 11 is based on FIG. 7 and demonstrates some of the steps for the flow of packets in a round-trip through two reciprocal slingshots constituting a Slinghop, inserted into a regular internet path. SRV_BBX can either incorporate a super computer node (SCN) functionality or be connected to an SCN. Parallel file systems (PFS) denote storage devices available in a global cluster reachable via remote direct memory access (RDMA) for both reads and writes of files utilizing Slingshot technology as described in U.S. Provisional Patent Application No. 62/266,060 International Patent Application No. PCT/IB 16/01867.

On the straight path along the figure, IP packets transmit naturally along segments over hops from P0-1 through P0-14 and travel in both directions.

A set of sequential steps are hereby described for travel in one direction from 11-A through 11-G:

Step 11-A: The start of the path. Traffic travels through three segments P0-1, P0-2, and P0-3.

Step 11-B: Traffic enters the Slinghop at this point 11-B; from the client perspective, the traffic will flow through segment 11-CPT306 to the hop at 11-F.

Step 11-C: Transparent to the client, the traffic will be diverted from the open internet pathway at 11-B and sent to 11-C, where IP packets are captured on entry and packaged within the file to be processed by the Write Queue 11-WQ502 of backbone exchange server 11-502. The traffic is enclosed within a transport file (see FIG. 23) and saved to parallel file storage (PFS) device 11-606 at step 11-D.

Step 11-D: The file saved from the Write Queue (can also be a direct write via RDMA) on SRV_BBX/SLN 11-502 is read from PFS 1-606 by SRV_BBX/SLN 1-506 along with complete files during a tick of time (see Granularity of a Tick at U.S. Provisional Patent Application No. 62/296,257) in a batch according to FIG. 24 for batch read of complete files. See FIG. 25 for read of file in one batch and use 25-RQP00 via 25-RQP606. Once used, the files are marked by process Post P 25-Q00 via 25-Q606. This marking of files is essential so that a file is not read twice by two overlapping batches. For the batch during time duration 25-T08 in WS ms. During the next batch time duration of 25-T18, the next files are read and used 25-RQP10 via 25-RQP616, after use marked by process Post P 25-Q10 via 25-Q616.

Step 11-E: The file is retrieved by Read Queue 11-RQ506 manager on backbone exchange server (SRV_BBX) 11-506 and it is divided into individual packets. The packets re-enter the internet pathway at 11-F from 11-E via path 11-P506. They are therefore re-packetized and sent on their way.

Step 11-F: Each packet(s) re-enters and then travels across the standard internet pathway from the IP address of 11-F to 11-G via segments P0-11, P0-12, P0-13, to P0-14.

Step 11-G: Each packet travels to destination past 11-G in Internet local 11-CTP240 via the path from SRV_BBX 11-506 via path 11-CPT200.

The following sequential steps are hereby described for travel in the other direction from 11-H to 11-N.

Step 11-H: Return packets or packets originating from the internet in close proximity to 11-H travel via path P0-14 to P0-13 to P0-12 to P0-11 and enter the Slinghop at 11-I.

Step 11-I: Packets enter Slinghop via IP address at 11-I end of segment P0-11 and are passed to SRV_BBX/SLN 11-506 where the packets are combined into the payload of a "carrier" file consisting of various packets.

Step 11-J: The combined "carrier" file of various packets is saved to PFS 11-602 by Write Queue 11-WQ506 via path 11-W602 from SRV_BBX/SLN 11-506.

Step 11-K: The Read Queue 11-RW502 regularly pulls batches of files from PFS 11-602. The operation on the SRV_BBX 11-502 at step 11-K is very similar to 11-D.

Step 11-L: The "carrier" file is retrieved by Read Queue 11-RQ502 manager on SRV_BBX/SLN 11-502 and it is divided into individual packets. The packets re-enter the internet pathway at 11-M from 11-F via path 11-P502. They are therefore re-packetized and sent on their way.

Step 11-M: Each packet re-enters and then travels across standard internet pathway from the IP address of 11-M to 11-N via segments P0-3, P0-2, to P0-1.

Step 11-N: Each packet travels to destination past 11-N in Internet local 11-CTP140 via the path from SRV_BBX/SLN 11-502 via path 11-CPT100.

The noted time comparison and other elements are based on FIG. 6 and are included in this figure as a point of reference only. The key point here are the steps outlined above.

From the packet's perspective, 11-CPT306 and 11-CPT302 are each just another segment between two hops, although they replace many middle hops and benefit from the efficiency of slingshot technology.

Figure 12:
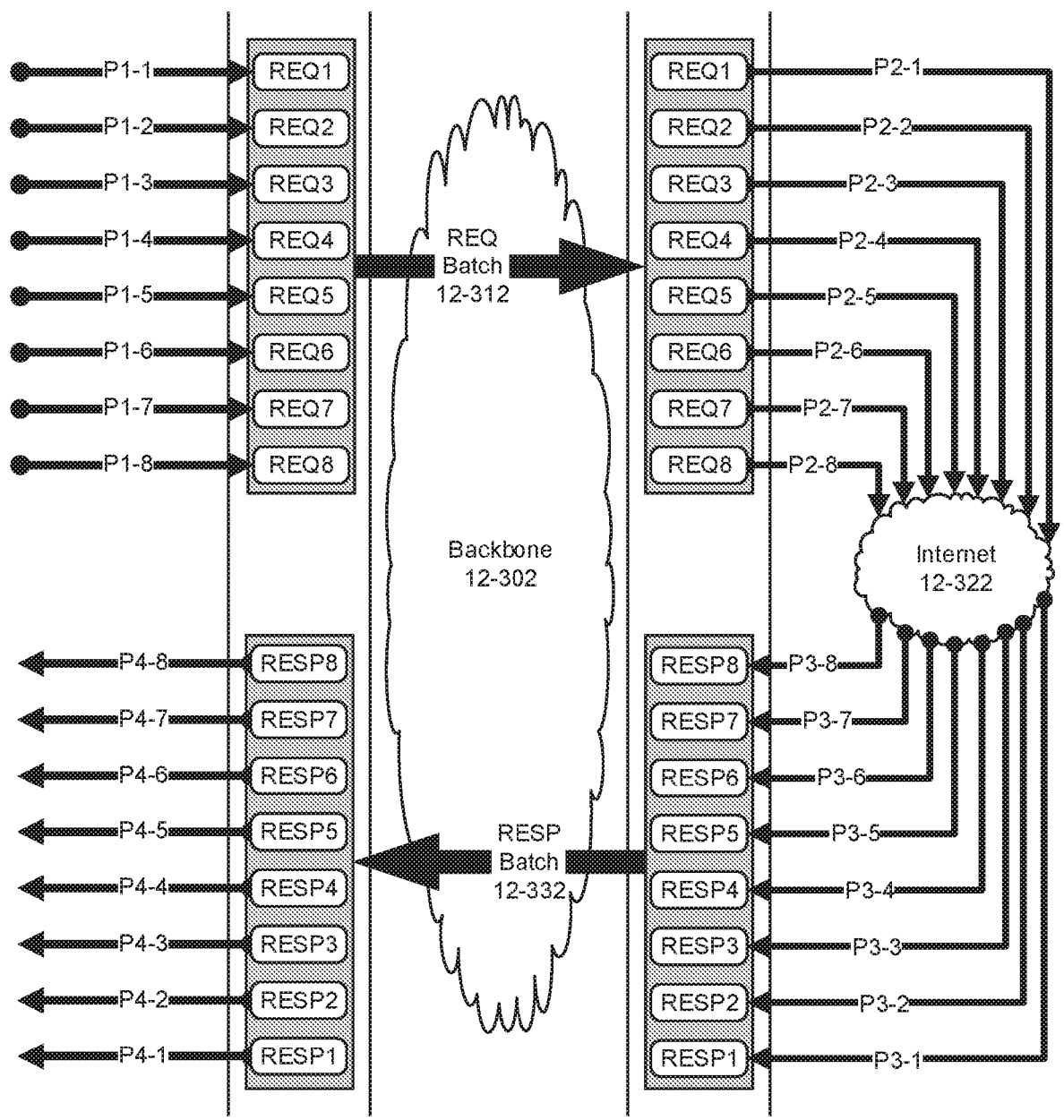
FIG. 12 illustrates the process of Slinghop's operations and its conversions of packets to files and then back to packets in both directions of the Slinghop.

FIG. 12 is an extension of FIG. 11, and it details the process of Slinghop's operations and its conversions of packets to files and then back to packets in both directions of the Slinghop. This figure demonstrates, in some embodiments, how request packets P1-1 through P1-8 are received by Slingshot, combined into a request batch 12-312 which is slingshot to the other side to be separated and individual packets P2-1 through P2-8 passed to the internet 12-322. Individual responses P3-1 through P3-8 are received by the slingshot and combined into a RESP Batch 12-332 to be separated back into individual response packets P4-1 through P4-8.

As an illustration, 11-CPT306 is the Slinghop for a request from an origin before segment P0-1 to a target beyond P0-14 with a response of 11-CPT302 sent back via Slinghop.

The flow corresponds to the paths of the receiving of a series of packets via paths P1-1 through P-1-8 by a SRV_BBX/SLN and their subsequent buffering into a combined file by the Write Queue. The file consisting of REQ1 through REQ8 packets is sent in one direction via a save to PFS 11-606 through Slinghop REQ Batch 11-312.

The flow corresponds to the paths of the receiving of a series of packets via paths P1-1 through P-1-8 by a SRV_BBX/SLN and their subsequent buffering into a combined file by the Write Queue. The file consisting of REQ1 through REQ8 packets is sent in one direction via a save to PFS 11-606 through Slinghop REQ Batch 11-312.

From the exit point for the REQ Batch 12-312 the individualized packets follow paths P2-1 through P2-8 to their corresponding destination addresses on the Internet 12-322. Assuming that the target hosts are all live and respond, their return packets locate and re-enter the Slinghop transparent segment via paths P3-1 through P3-8 to be recombined into a file which is then transmitted via file save across path RESP Batch 12-332. Upon reaching the other end of the transparent Slinghop, the file is read and packets individually go back to their originating devices via paths P4-1 through P4-8.

Figure 13:
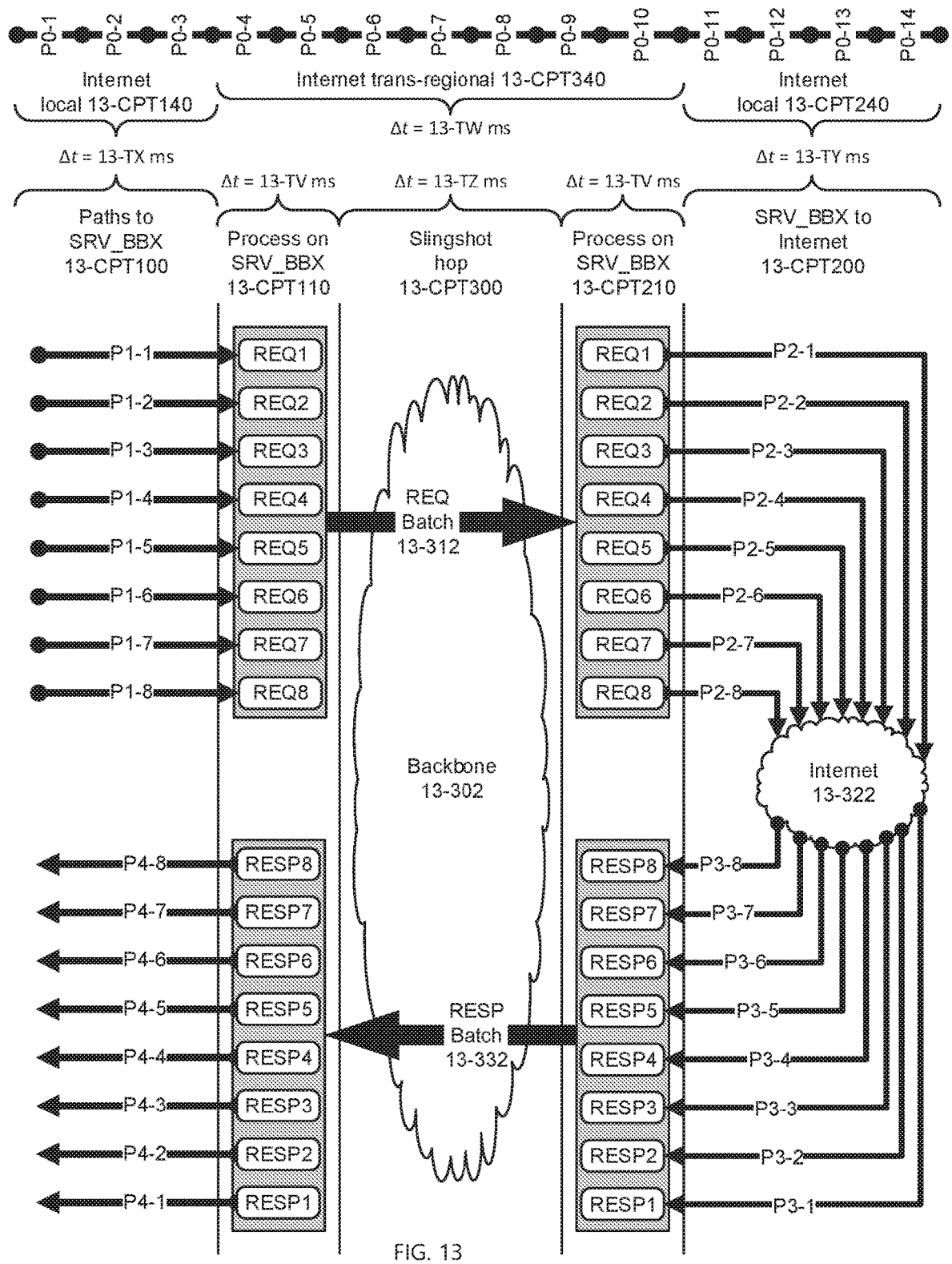
FIG. 13 elaborates on FIG. 12 by adding timeline comparisons between internet and sling.

FIG. 13 is based on FIG. 12 with the addition of relative time comparisons to evaluate the utility of Slinghop transparent hop (Process on SRV_BBX 13-CPT110 plus Slingshot hop 13-CPT300 plus Process on SRV_BBX 13-CPT210) versus transit over Internet trans-regional 13-CPT340 segments. In this figure, references to SRV_BBX can refer to a standalone SRV_BBX, a sling node (SLN), or a combination of both.

In some embodiments, a packet gets combined, encapsulated or otherwise joined into a carrier file which contains the slingshot payload, then the slingshot file is transported and on the other side, the contents of the payload are separated back into their individual parts, and the packet is then sent on.

Elements 13-TW, 13-TX, 13-TW, 13-TY, and 13-TZ in this figure directly correlate with elements TV, TX, TW, TY, and TZ in the equations Equation 13-1, Equation 13-2, and Equation 13-3 below.

Total path latency for the internet path can be deduced from the sum of the time duration $\Delta t$ of Internet local 13-CPT140 plus Internet trans-regional 13-CPT340 plus Internet local 13-CPT240.

$$\text{Total Internet Path Time } \Delta t(P004) = \Delta t(\text{TX ms}) + \Delta t(\text{TW ms}) + \Delta t(\text{TY ms}) \quad \text{Equation 13-1:}$$

Total path latency for Slinghop enhanced hybrid Internet+Slinghop path can be calculated by adding the sum of Paths to SRV_BBX 13-CPT100 plus Process on SRV_BBX 13-CPT110 plus Slingshot hop 13-CPT300 plus Process on SRV_BBX 13-CPT210 plus SRV_BBX to Internet 13-CPT200.

$$\text{Total Internet-Slinghop Hybrid Path Time } (P504) = \Delta t(\text{TX ms}) + 2 \cdot \Delta t(\text{TV ms}) + \Delta t(\text{TW ms}) + \Delta t(\text{TY ms}) \quad \text{Equation 13-2:}$$

The $\Delta t$ 13-TX ms is equivalent for zones Internet local 13-CPT140 and Paths to SRV_BBX 13-CPT100.

The $\Delta t$ 13-TY ms is equivalent for zones Internet local 13-CPT240 and Paths to SRV_BBX 13-CPT200.

The Process steps 13-CPT110 and 13-CPT210 indicate both the short-term RAM buffer for clumps.

Slingshot Hop 13-CPT300 is a transparent hop from the client perspective.

Figure 14:
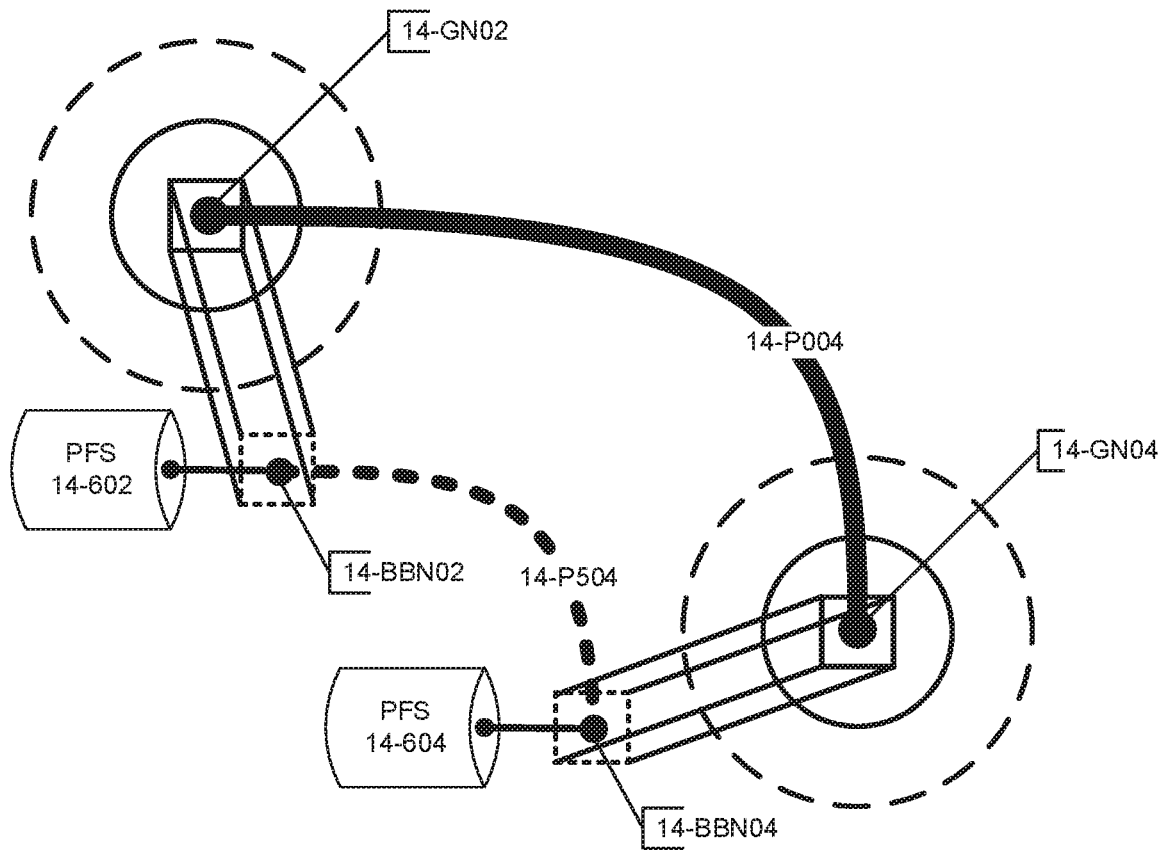
FIG. 14 illustrates a few of the connectivity options available between two global nodes.
Figure 14:
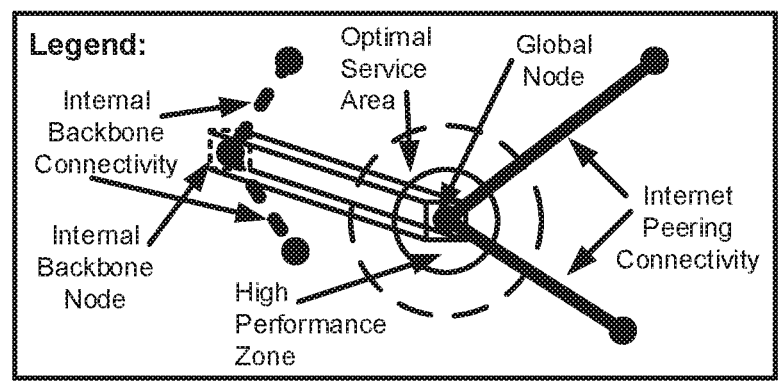

FIG. 14 demonstrates a few of the connectivity options available between two Global Nodes 14-GN02 and 14-GN04. This figure visualizes the shorter time to write from one region 14-GN02 to a PFS 14-604 versus the time it takes for an internet packet to transit via 14-P004. And back from 14-GN04 to PFS 14-602. One connectivity option is via internet through path 14-P004 and the other connectivity option is via Slinghop through path 14-P504. The slingshot path 14-P504 indicates the latency between two backbone nodes 14-BBN02 and 14-BBN04 via Slinghop powered by slingshot over backbone fiber or equivalent connectivity. The internet path 14-P004 represents connectivity via multiple various path options through the internet and their corresponding range of latencies between those points.

This example embodiment demonstrates the functionality of the plumbing which powers Slinghop as illustrated in FIG. 13. When comparing the total latency for path 14-P004 against path 14-P504, the equations as noted in FIG. 13 are utilized. For simplicity sake, the two processing steps of Process on SRV_BBX (and SLN) 13-CPT110 and Process on SRV_BBX (and SLN) 13-CPT210 consume the same duration of time.

The improvement of Slinghop at Slingshot hop 13-CPT300 therefore needs to include the times of the processing steps of Process on SRV_BBX 13-CPT110 and Process on SRV_BBX 13-CPT210, therefore 13-TV*2.

Based on FIG. 13, the duration of time ($\Delta t$) for the Internet trans-regional 13-CPT340 segment is labelled as 13-TW and is measured in milliseconds (ms). In this figure, this is noted as $\Delta t\{\text{TW ms}\}$. The duration of time ($\Delta t$) for slingshot hop 13-CPT300 is labelled as 13-TZ in this figure, and its associated processing segments "Process on SRV_BBX" 13-CPT110, 13-CPT210. These are also measured in ms. In this figure, this is noted as $\Delta t\{\text{TV}+\text{TZ}+\text{TV}\}$.

So therefore for Slinghop to be effective, it must be more efficient and have a lower latency than the connectivity through the open internet:

Equation 14-1:

$\Delta t\{TV+TZ+TV\} < \Delta t\{TW\ ms\}$. The meaning of this equation is that the combined time for: TV, which is processing to add items to and prepare the slingshot payload; TZ, which is the sending of the payload by slingshot; and TV, which is the processing of the payload to separate back into separate elements. The sum of these three parts is the total time for slingshot. TW represents the time that it would take for a packet to transit the internet via an IP path. TV at either end adds time. TZ is a speedy transport. The point is that the marginal time added by TV at either end should be compensated for by the faster time of TZ. When comparing TV+TZ+TV, the net total should still be smaller than TW Therefore, $\Delta t\{TV+TZ+TV\}$ must be less than $\Delta t\{TW\ ms\}$. The rationale is that the added duration of time added by the requisite processing $\Delta t(TV)$ at both ends of a Slinghop must be offset by the speed advantage offered by the Slingshot section of the segment $\Delta t(TZ)$ between Slinghop endpoint bridgeheads.

There are other advantages presented by slinghop, such as a wide parallel bandwidth which is more efficient than packetized IP traffic over distance but this is not described by this figure.

Figure 15:
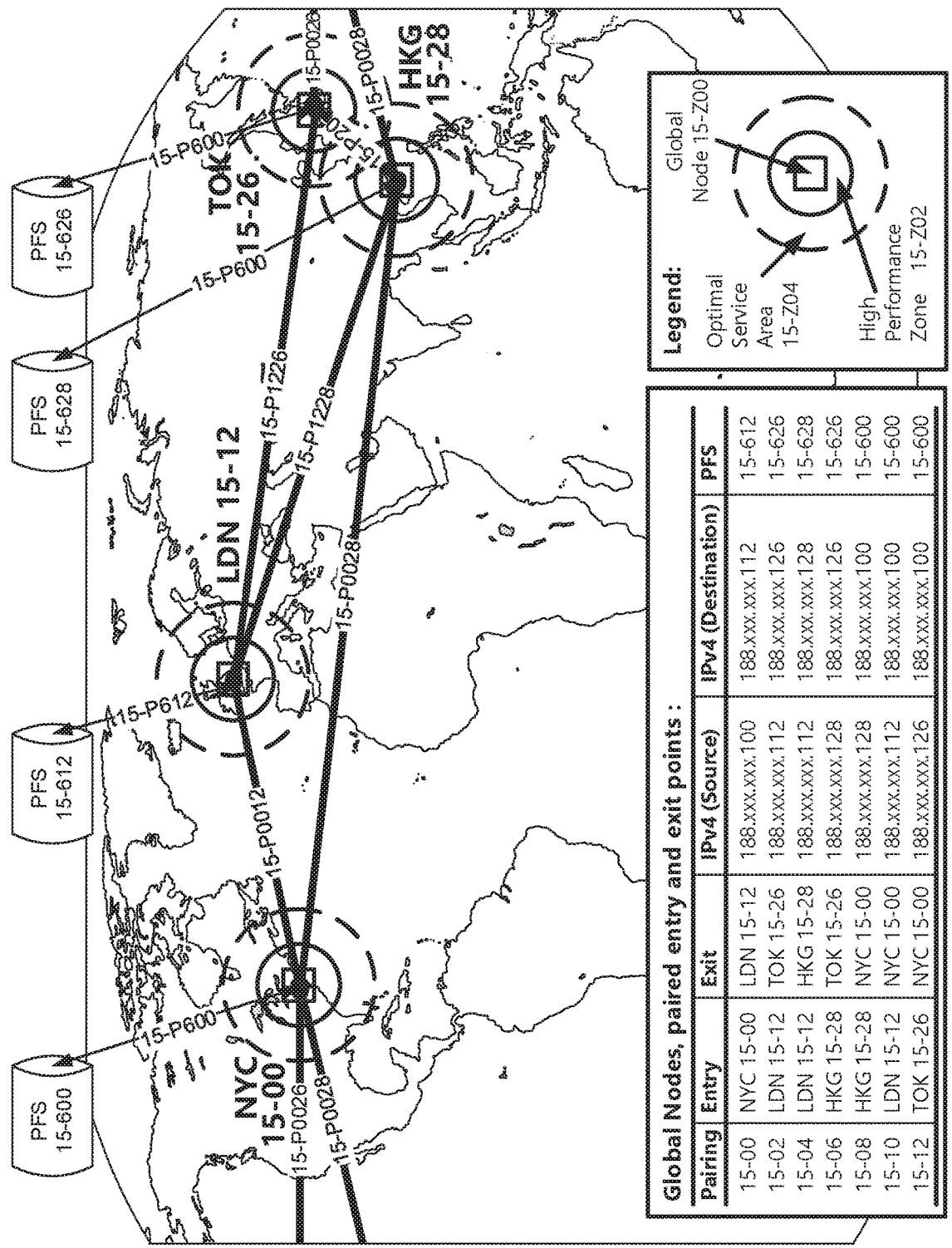
FIG. 15 illustrates demonstrates backbone connections between various key financial markets.

FIG. 15 demonstrates backbone connections between various key financial markets. This figure demonstrates the geographic placement of a few global nodes of a GVN and example connectivity paths. For illustrative purposes, the lines are drawn as straight lines between points.

In reality, due to political/administrative boundaries, city limits, zoning, geographic features such as bodies of water, various elevation changes, and other reasons, the actual routes of pipes are rarely ever straight or direct. However, the additional distance caused by path deviations from the potentially most direct route in most cases do not add enough distance to have a significantly adverse effect of added latency.

Segments can be described as city/location pairs and for Slinghop purposes, the origin end-point of the Slinghop is represented by an IP Address of a server or gateway device there, with segment transiting over the Slinghop segment to IP address of the server or gateway device at the target end-point city/location.

Transit from one location to the other is as simple as from origin IP address to target IP address and for the return path the IP addresses are in reciprocal order. This single segment replaces many other IP segments over the internet and is optimized by Slinghop.

PFS naming can be based on last octet or last 2 octets of an IP address. PFS naming can also include city code, region, IP Address, noted world nodes, and more factors. IP address pairs denoting bridgeheads at either end of a segment.

For example, from 188.xxx.xxx.128 to 188.xxx.xxx.100 is by writing to PFS 15-600. And if back, from 188.xxx.xxx.100 to 188.xxx.xxx.128 is by writing to PFS 15-628.

Like airline routes for roundtrips, combination of two one-way segments constitute a Slinghop transparent roundtrip integration nested into an existing IP pathway.

Figure 16:
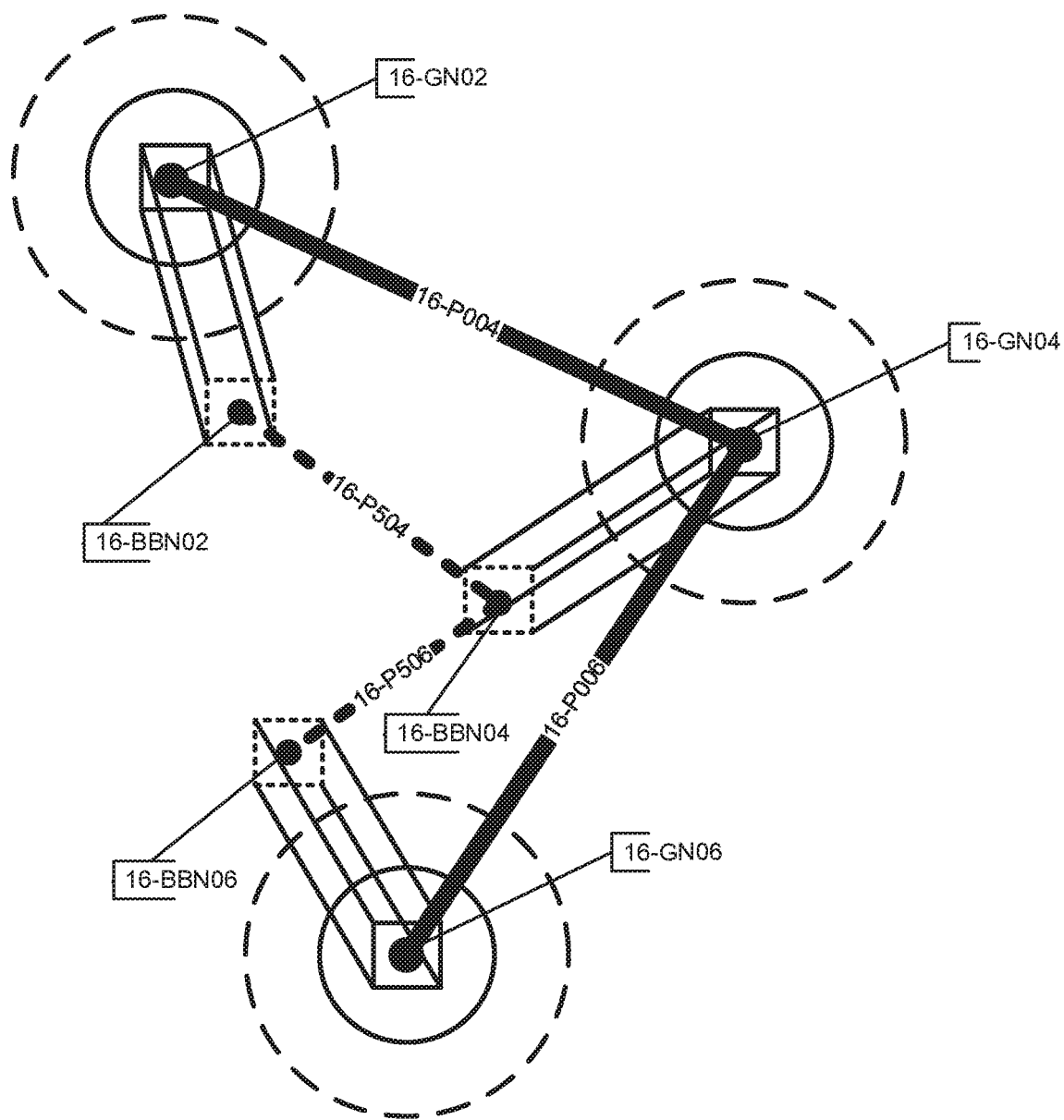
FIG. 16 illustrates both the internet pathways and the Slinghop paths among three global nodes.

FIG. 16 demonstrates both the internet pathways and the Slinghop paths among three global nodes, 16-GN02, 16-GN04, and 16-GN06. This figure is based on FIG. 14 and adds an additional regional location. All three PFS devices are available to slingshot. It compares pass-through efficiency and speed advantage between sling and internet. Paths 16-P004 and 16-P006 are through the internet. Paths 16-P504 and 16-P506 are via Slinghop.

Figure 17:
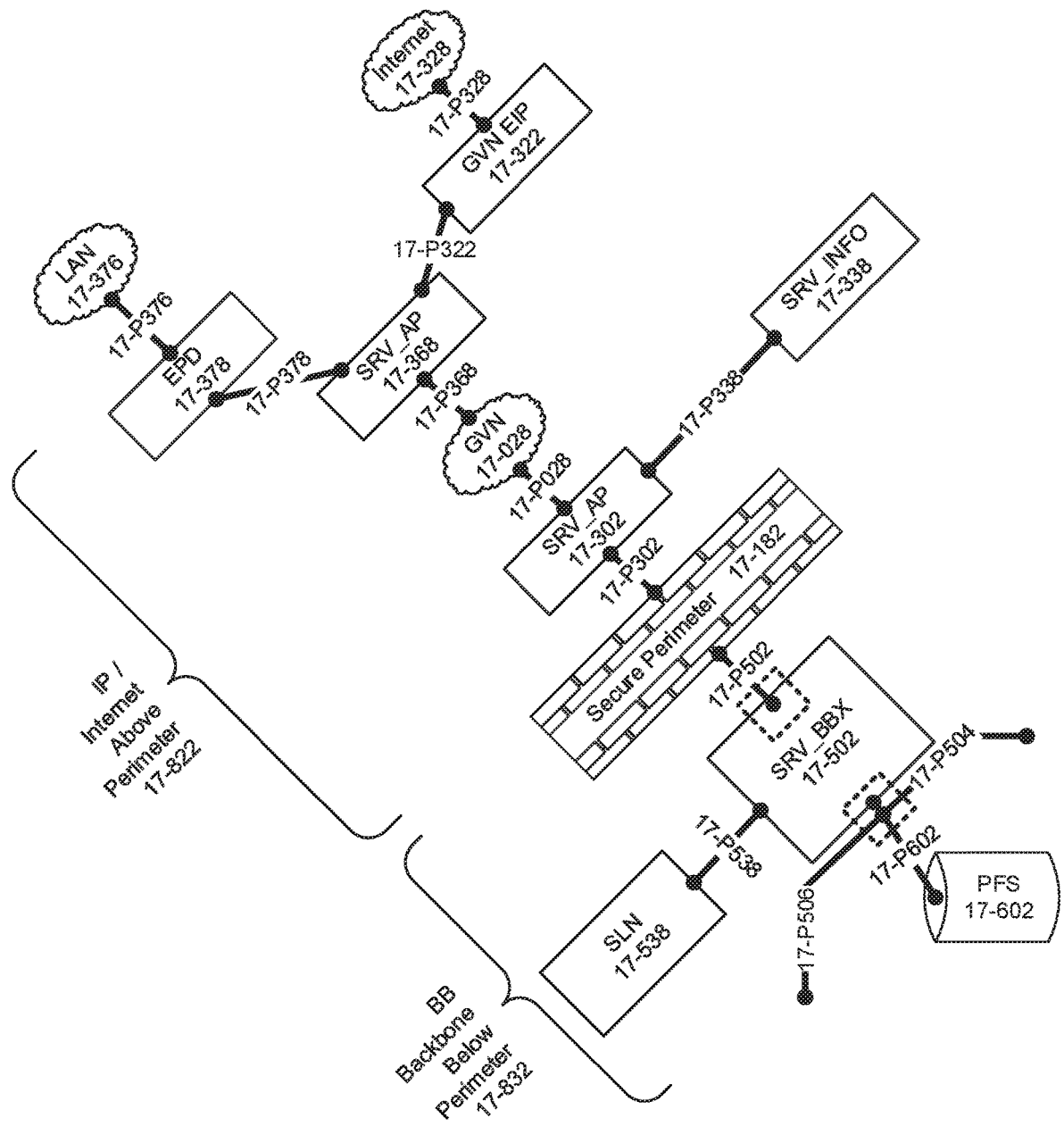
FIG. 17 illustrates how a global virtual network (GVN) can incorporate technologies such as Network Slingshot to seamlessly realize great advantages over distance.

FIG. 17 illustrates how a global virtual network (GVN) can incorporate technologies such as Network Slingshot to seamlessly realize great advantages over distance. Network Slingshot is further described in U.S. Provisional Patent No. 62/266,060 or International Patent Application No. PCT/IB16/01867.

FIG. 17 describes a global virtual network GVN 17-028 connecting LAN 17-376 via endpoint device EPD 17-378 or an egress/ingress path via EIP 17-322 to SRV_AP 17-368. It also describes how an SRV_AP 17-302 is a front "head" to connect to a sling powered Slingshot and or Slinghop. The backbone exchange server SRV_BBX 17-502 connects to sling nodes SLN 17-538 and global sling backbone 17-P506 to 17-P504 as well as to PFS devices 17-602.

The first boundary is GVN egress ingress point (EIP) 17-322 between the internet 17-328 and the GVN 17-028 or EPD 17-378 between a LAN 17-376 and the GVN 17-028. The next boundary is the secure perimeter 17-182. This layered security approach protects the core infrastructure upon which the GVN is predicated.

The secure perimeter 17-182 boundary between GVN and GVN backbone protect the high speed global network. The section of the GVN above the perimeter 17-822 has traffic flowing over the top (OTT) the open internet via secure GVN tunnels. Under the secure perimeter 17-182, GVN connections utilize various protocols over dark fiber or other connectivity which are not directly reachable from the internet.

A sling node (SLN) 17-538 can be a super computer/cluster node (SCN), a high-performance computer/cluster (HPC), or equivalent which operates inside of (below) the secure perimeter 17-832 which can operate a true internal network with advanced features such as remote direct memory access (RDMA) to a parallel file system (PFS) 17-602 device.

Global Ring for PFS storage devices via 14-P506 and 14-P504 along with other nodes not noted herein.

SRV_AP 17-302 feeds and/or retrieves information to/from SRV_INFO 17-338.

Secure Perimeter 17-182 is between IP traffic over Ethernet above SP 17-182 and non-IP internal Slingshot/Slinghop traffic below it.

Figure 18:
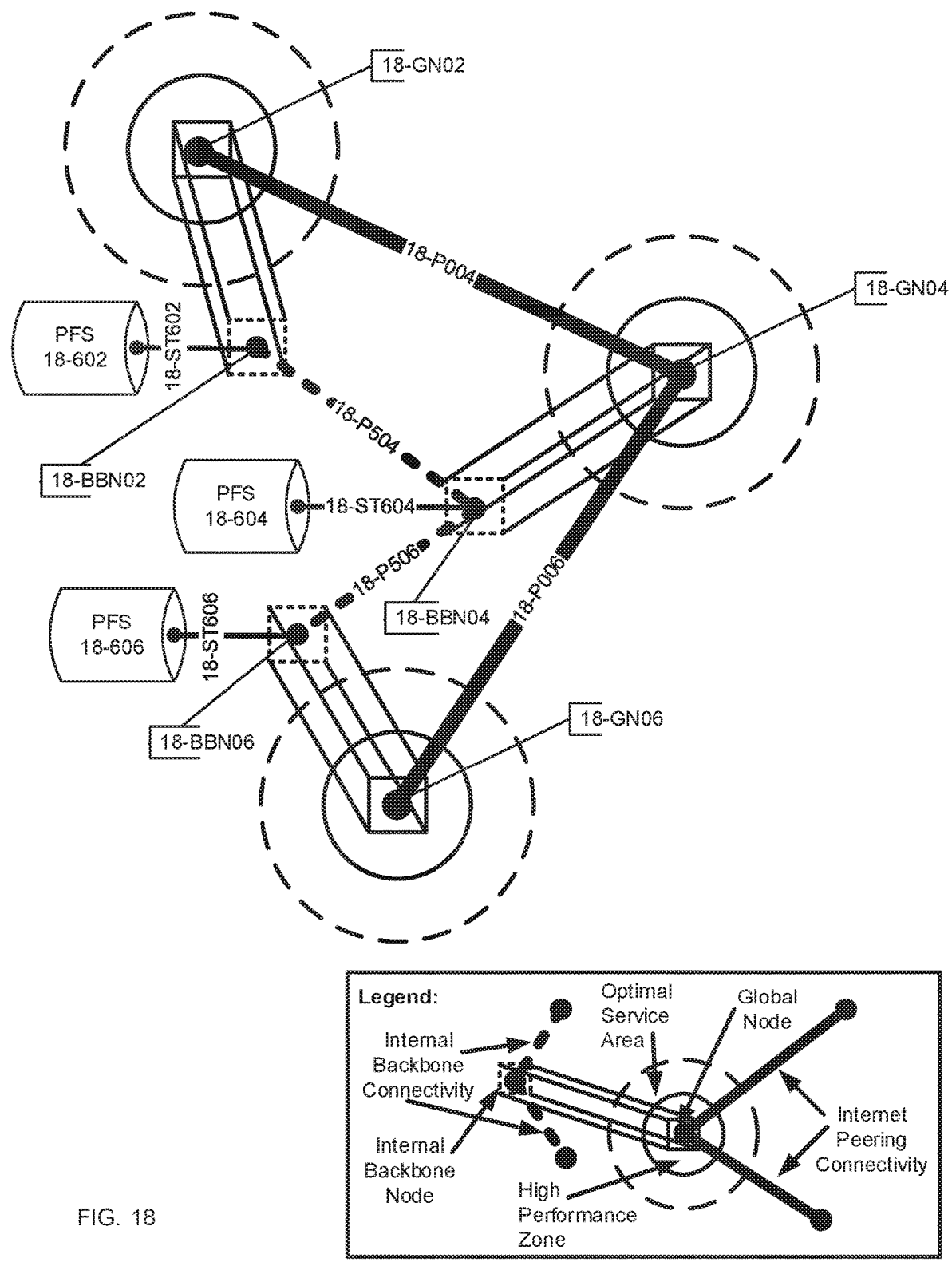
FIG. 18 illustrates how the various devices are addressable in each region by their type and location.

FIG. 18 is an extension of FIG. 16, and it illustrates the topology of a Slinghop mechanism indicating the placement of PFS devices 18-602, 18-604, and 18-606. It further demonstrates how they can be directly connected through one segment 18-P504 or via two or more joined segments 18-P504 to 18-P506. The key point is that a sling node in region 18-GN02 can write to a PFS 18-604 in region 18-GN04 or to PFS 18-606 in region 18-GN06, etc. These writes are direct and do not have to be relayed between PFS devices in an intermediary region.

Figure 19:
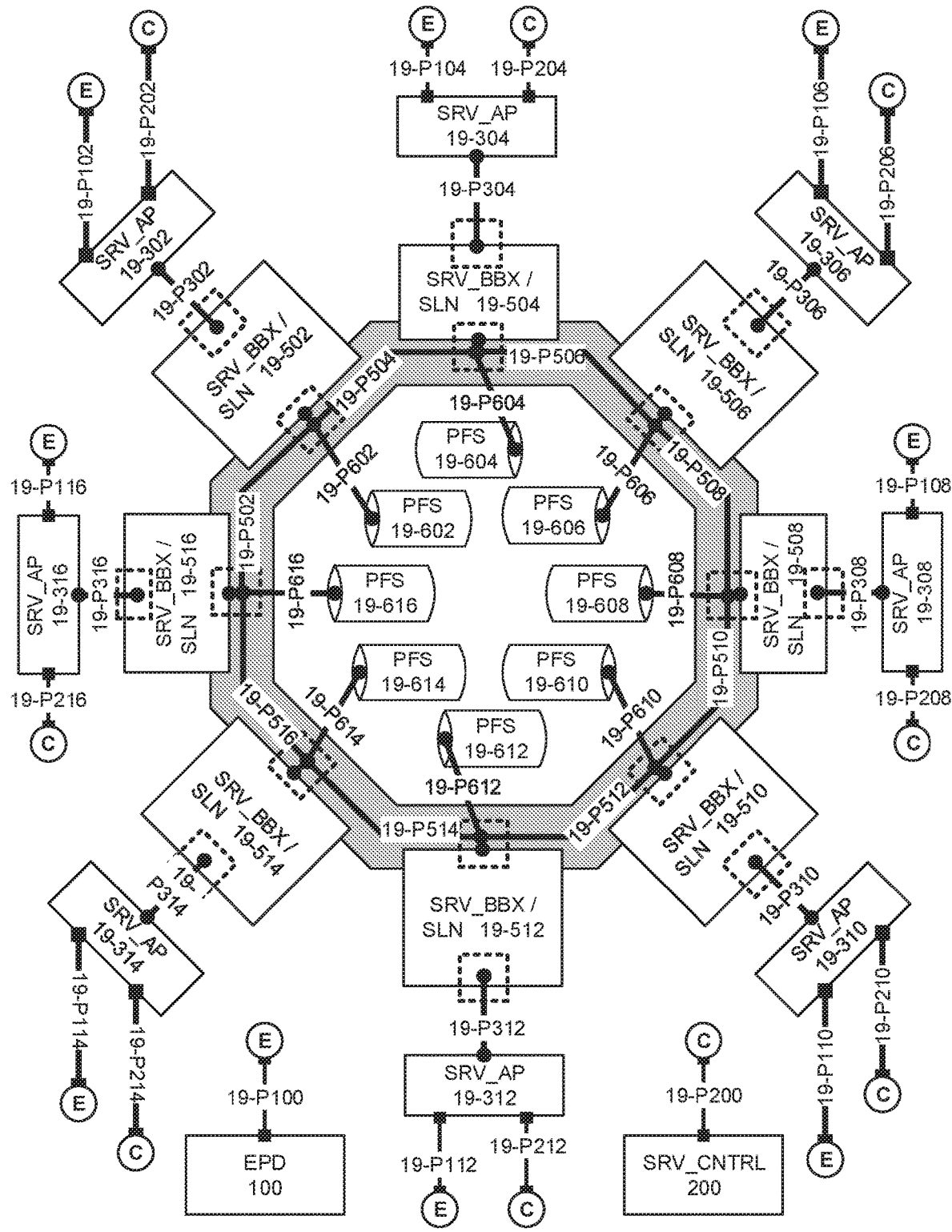
FIG. 19 demonstrates the Slinghop internals and operations with respect to topological structure.

FIG. 19 demonstrates the Slinghop internals and operations with respect to topological structure. FIG. 19 is not to scale. It demonstrates how backbone exchange servers (SRV_BBX) and sling nodes (SLN) 19-502 through 19-516 can access and write to various PFS devices such as 19-602 through 19-616. They are all connected via an internal backbone of various joined segments 19-P502 through 19-P516. As an example, it shows how the Slinghop can integrate with a GVN and some of its devices such as an access point server (SRV_AP) 19-302, an end-point device (EPD) 100, and a central control server (SRV_CNTRL) 200.

Figure 20:
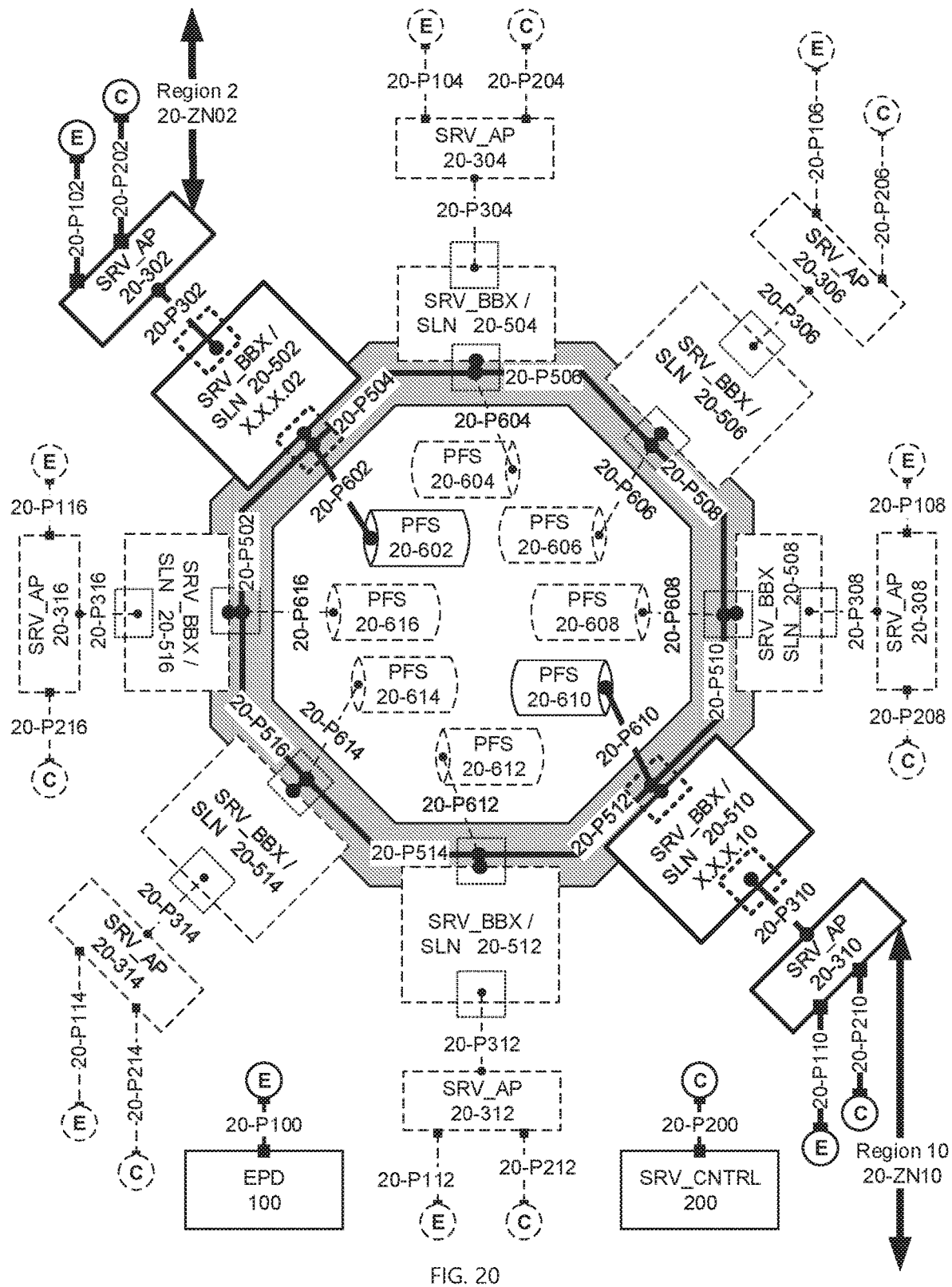
FIG. 20 illustrates examples showing how Slinghop nodes can be found.

FIG. 20 is based on FIG. 19 with some exceptions. The key point is that Slinghop nodes can be found by for example IP address X.X.X.02 on BBX/SLN 20-502 or IP address X.X.X.10 on SRV_BBX/SLN 20-510. Differences between these example embodiments are that most of the bridgehead node points are faded to show availability with two bridgehead node points noting Slinghop connectivity from Region 2 20-ZN02 to Region 10 20-ZN10 via SRV_BBX/SLN 20-502 to write via RDMA directly PFS 20-610 with SLN/SRV_BBX 20-510 reading the carrier file and using it in Region 10 20-ZN10. Reciprocal traffic in the other direction from Region 10 20-ZN10 to Region 2 20-ZN02 is written via RDMA by SRV_BBX/SLN 20-510 to PFS 20-602. The carrier file is read by SRV_BBX/SLN 20-502 to be used there.

These bridgeheads are bolded to highlight their place and focus. IP addresses are noted for illustrative purposes X.X.X.02 on SRV_BBX/SLN 20-502 and X.X.X.10 on SRV_BBX/SLN 20-510 as either end. Slinghop is therefore from Region 2 to Region 10 by IP order of X.X.X.02 to X.X.X.10, and back from Region 10 to Region 2 via IP order of X.X.X.10 to X.X.X.02.

Slingshot matches the target region and maps it to a PFS drive 20-610 or 20-602 which will be accessed by the read queue on an SLN on the remote side.

Figure 21:
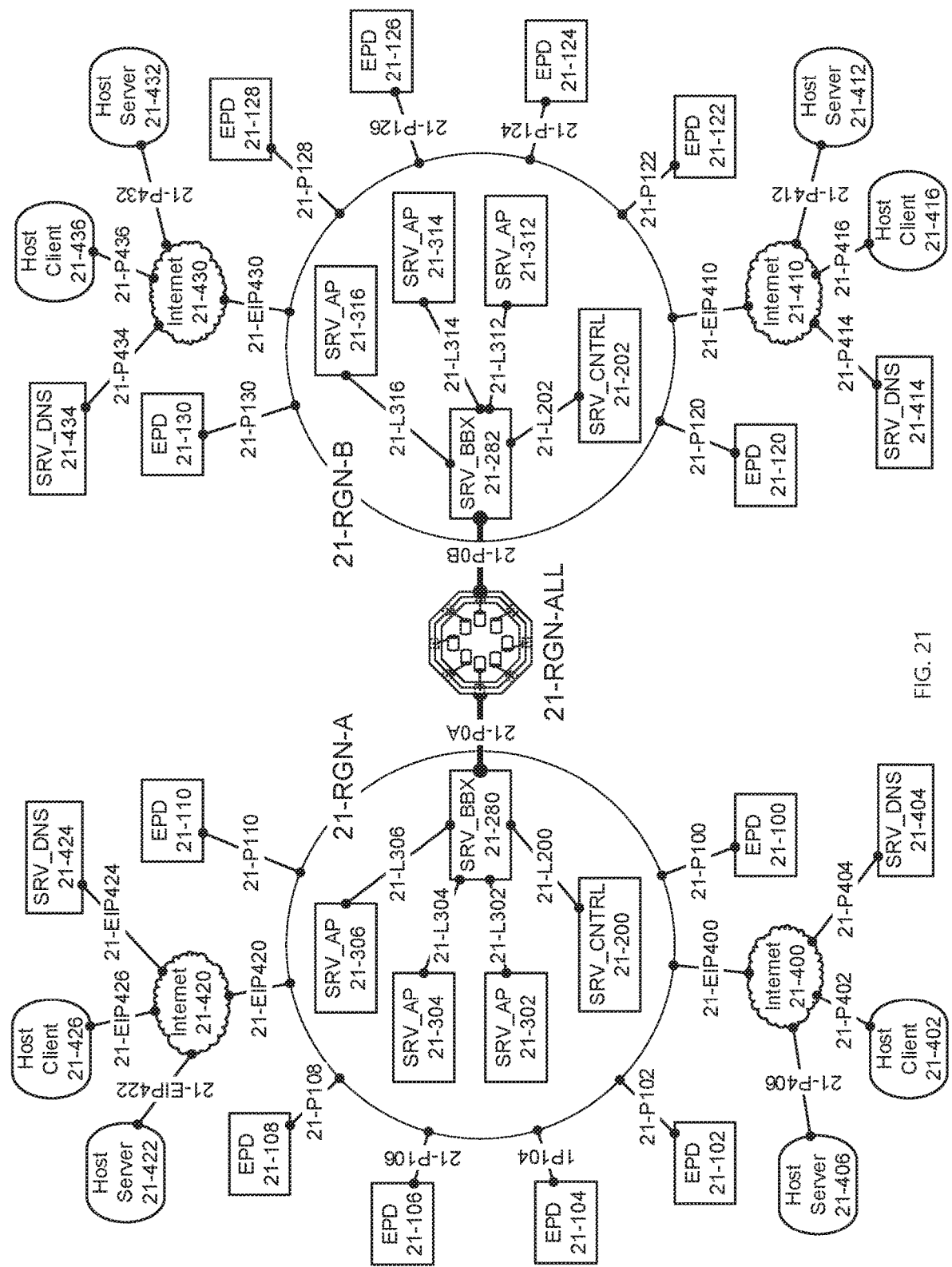
FIG. 21 illustrates a global virtual network (GVN) or similar globally distributed network using hub and spoke topology with octagon routing on the backbone, with egress/ingress points (EIP) noted.

FIG. 21 illustrates a global virtual network (GVN) or similar globally distributed network using hub and spoke topology with octagon routing on the backbone, with egress/ingress points (EIP) noted. The octagon shape is for illustrative purposes only to relate the FIG. 20 into a broader picture.

FIG. 21 shows the network topology of a GVN in two different regions 21-RGN-A and 21-RGN-B and how the regions are connected via paths 21-P0A and 21-P0B through global connectivity 21-RGN-ALL. In addition, FIG. 21 demonstrates the hub & spoke connections in each of the two regions. The multiple egress-ingress points (EIP) 21-EIP400, 21-EIP420, and 21-EIP410, 21-EIP430 in each region are added spokes to the hub and spoke model.

SRV_BBX 21-280 and SRV_BBX 21-282 are backbone exchange servers and provide the global connectivity. A SRV_BBX may be placed as one or more load-balanced servers in a region serving as global links. Access point servers (SRV_AP) 21-302, 21-304 and 21-306 in 21-RGN-A connect to SRV_BBX 21-280. The central, control server (SRV_CNTRL) 21-200 serves all the devices within that region and it may be one or more multiple master SRV_CNTRL servers. End-point devices (EPD) 21-100 through 21-110 will connect with one or more multiple SRV_AP servers through one or more multiple concurrent tunnels.

This figure further demonstrates multiple egress ingress points (EIP) 21-EIP420, 21-EIP400, 21-EIP430, and 21-EIP410 as added spokes to the hub and spoke model with paths to and from the open internet. This topology can offer EPD connections to an EIP in remote regions routed through the GVN. In the alternative this topology also supports EPD connections to an EIP in the same region, to an EPD in the same region, or to an EPD in a remote region. These connections are securely optimized through the GVN. This also facilitates the reaching of an EPD from the open internet with traffic entering the EIP nearest to the source and being carried via the GVN realizing the benefits of the GVN's optimization.

In FIG. 21, RGN means Ring Global Node(s) or Regional Global Node(s), and RGN_ALL means All linked Global Nodes. Global Nodes can be managed by MRGN, which means Manager of Regional Global Nodes or Mesh of Regional Global Nodes.

Figure 22:
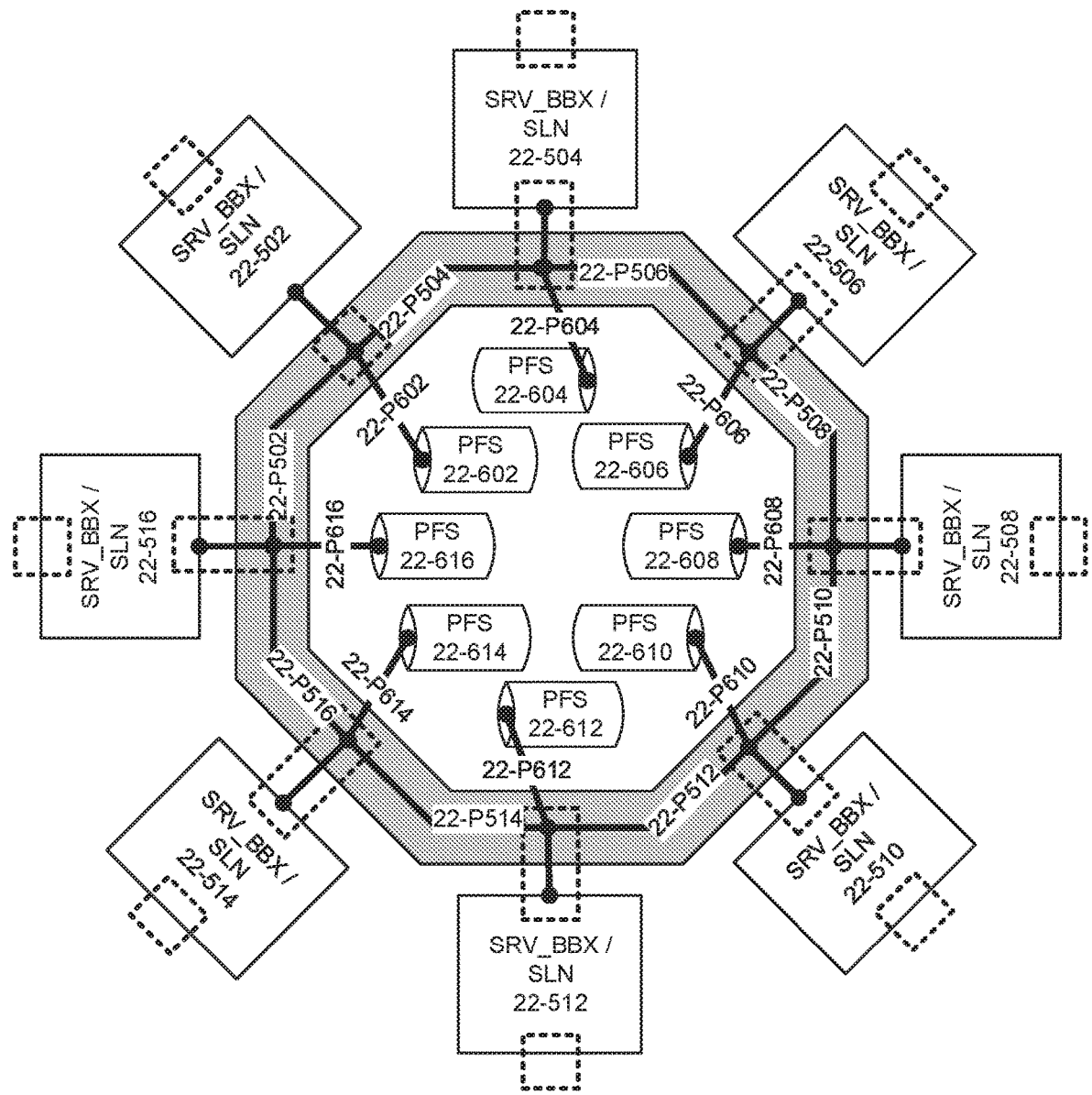
FIG. 22 describes the physical topology of a ring of global nodes.

FIG. 22 describes the physical topology of a ring of global nodes. This figure simplifies FIGS. 19 and 20, demonstrating the key points of global backbone 22-P502 through 22-P516, PFS drives 22-602 to 22-616, accessed by SRV_BBX/SLN 22-502 through 22-516. Each global node consists of a SRV_BBX device and their associated PFS device. The global nodes are connected to each other either directly or via one or more of the other global node(s).

In FIG. 21, an RGN is a "Regional Global Node" and the element 21-RGN-ALL represents "All linked Regional Global Nodes." The octagonal ring represented in FIG. 21 at element 21-RGN-ALL is hereby zoomed in on to provide a more detailed view.

Routing is based on the writing to a destination PFS device via RDMA, and the subsequent reading of the file by an SRV_BBX/SLN in the target region and subsequent use of the data there.

The global structure of PFS connectivity is octagonal for illustrative purposes and in reality, can take any shape. The Slinghop mechanism depends on the connection of various devices at a physical layer.

Based on FIGS. 19 to 21, this octagonal ring represents the routing options for Slinghops.

Figure 23:
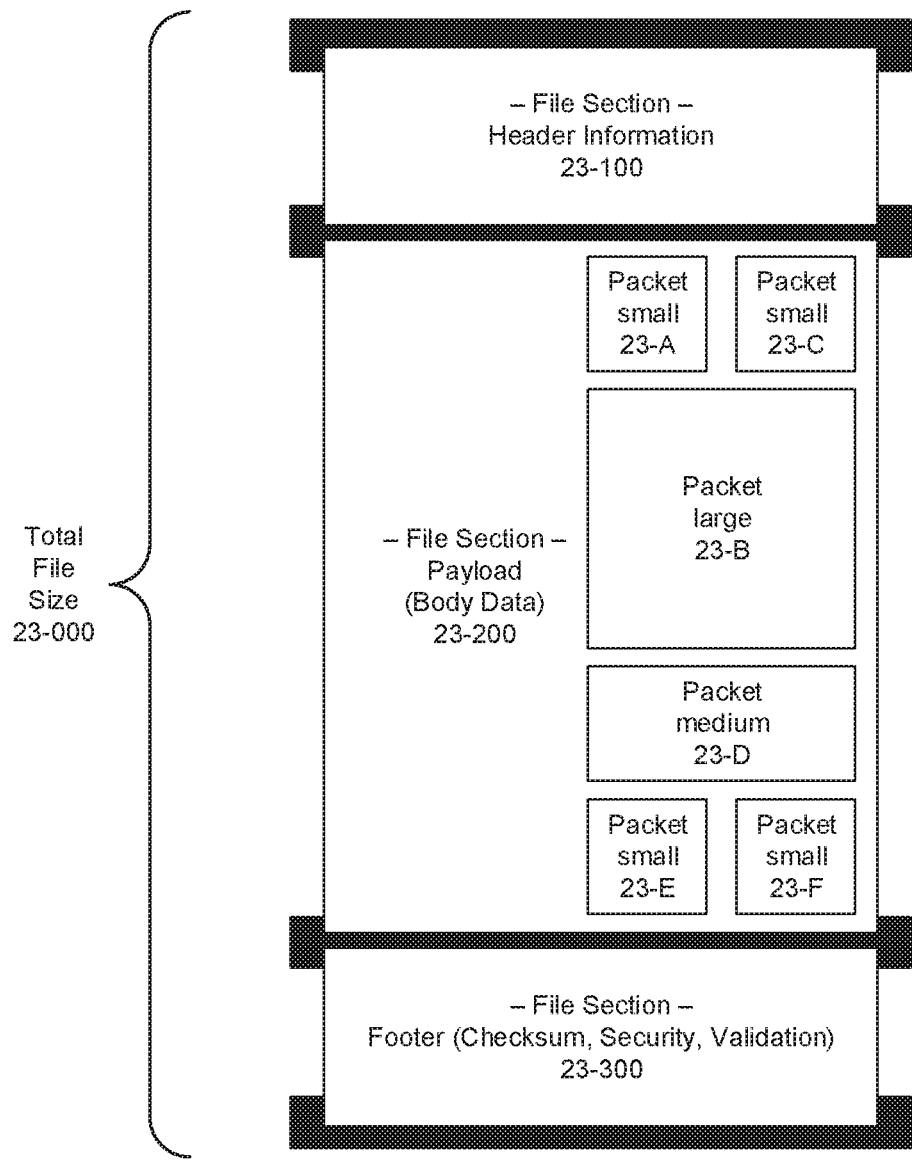
FIG. 23 illustrates how various sized packets can be contained inside the Slinghop carrier file.

FIG. 23 describes how various sized packets can be contained inside the Slinghop carrier file (e.g., various internet fabrics can be connected to sling nodes.) FIG. 23 describes a "carrier" file which is sent via Slingshot consisting of a payload of packets in the Body Data 23-200. This example embodiment describes a file of data organized in three defined sections: Header Information 23-100, Payload containing Body Data 23-200, and a Footer 23-300. This file could be stored in RAM, other memory, saved to disk, or otherwise stored in another form of memory or storage. Header can contain information about host origin, host destination, timestamp, and other info. Security information can be stored in fields in both the header and the footer section. This security information may hold references to keys to use for decryption, as well as other information. Payload (Body Data) may be encrypted in whole or in part or sent unencrypted. Payload checksum in the footer is used to validate the integrity of the body data. EOF notation in the Footer will indicate that the file has arrived, is complete and ready to be validated/verified for accuracy and then ultimately used.

FIG. 23 illustrates various packets of either a small packet size such as Packet 23-A, 23-C, 23-E, and 23-F, a medium Packet 23-D, or larger packets such as Packet 23-B.

These are combined into a carrier file for Slinghop transport powered by Slingshot and are separated into separate packets when the written file is accessed and utilized to continue their journey.

Figure 24:
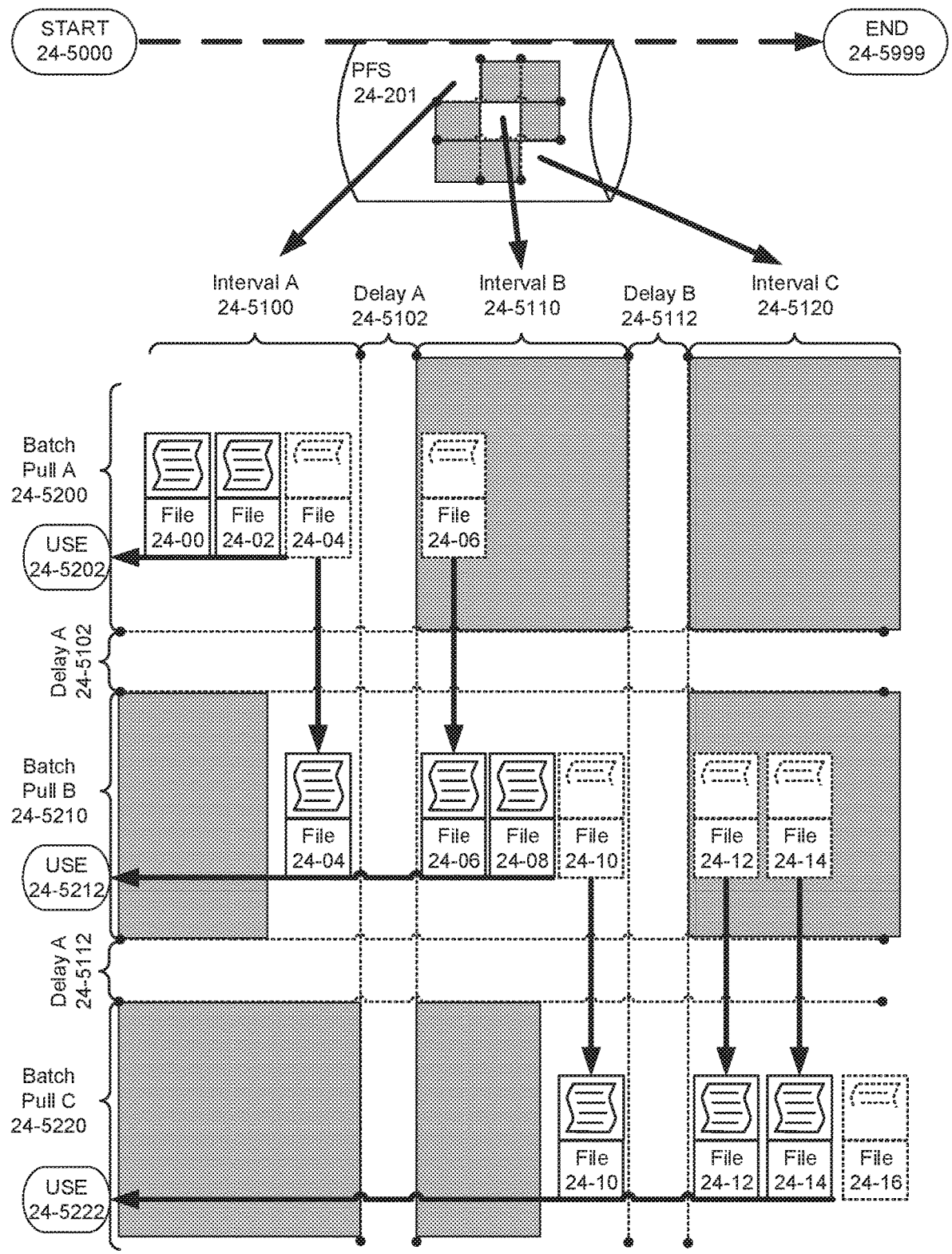
FIG. 24 describes a read process by a sling-node (SLN) in a sling process.

FIG. 24 describes a read process by a sling node (SLN) in a sling process. One of the key points of this example embodiment is to demonstrate the sequencing of file pull batches, handling of carrier file of clumps/combined packets or other files or data structures, and the processing of carrier files in parallel streams in an efficient manner avoiding duplicate use of files received.

This example embodiment illustrates the importance of a granularity of a tick in a practical application. It is based on FIG. 25 from U.S. Provisional Patent Application No. 62/266,060 and International Patent Application No. PCT/IB16/01867 and describes the pulling of a batch of files from a queue where new files will be continually appearing.

In FIG. 24, there are batches of file reads 24-5200, 24-5210, and 25-5220 which are timed with delays, and a mechanism to only read and use complete files. Those that are not yet complete meaning that they have not completely arrived are passed over to be checked by subsequent read batches. Those that have been used 24-5202, 24-5212, and 25-5222, are marked as being read, and or moved to another folder, or deleted, or otherwise marked or processed, so that the files which have already been processed are not processed again by subsequent read queue batches.

FIG. 24 describes the pulling of batches of files from PFS 24-201 over a period from START 24-5000 to END 24-5999. Time is described on both axes with Intervals across the top and batches along the left side.

Interval A 24-5100 and Batch Pull A 24-5200 occur at the same time. USE 24-5202 happens at the end of this interval. Interval B 24-5110 and Batch Pull B 24-5210 occur at the same time. USE 24-5212 happens at the end of this interval. Interval C 24-5120 and Batch Pull C 24-5220 occur at the same time. USE 24-5222 happens at the end of this interval.

There is a problem which exists by having one interval begin right after one has ended because there may not be enough time for a file to be marked as read, even though it has been read by a previous Batch process. This problem is described in FIG. 24 from U.S. Provisional Patent Application No. 62/266,060 and International Patent Application No. PCT/IB16/01867. This is a very dangerous flaw as for example, a trade request being executed twice could cause significant financial damage and/or other unintended consequences.

Figure 25:
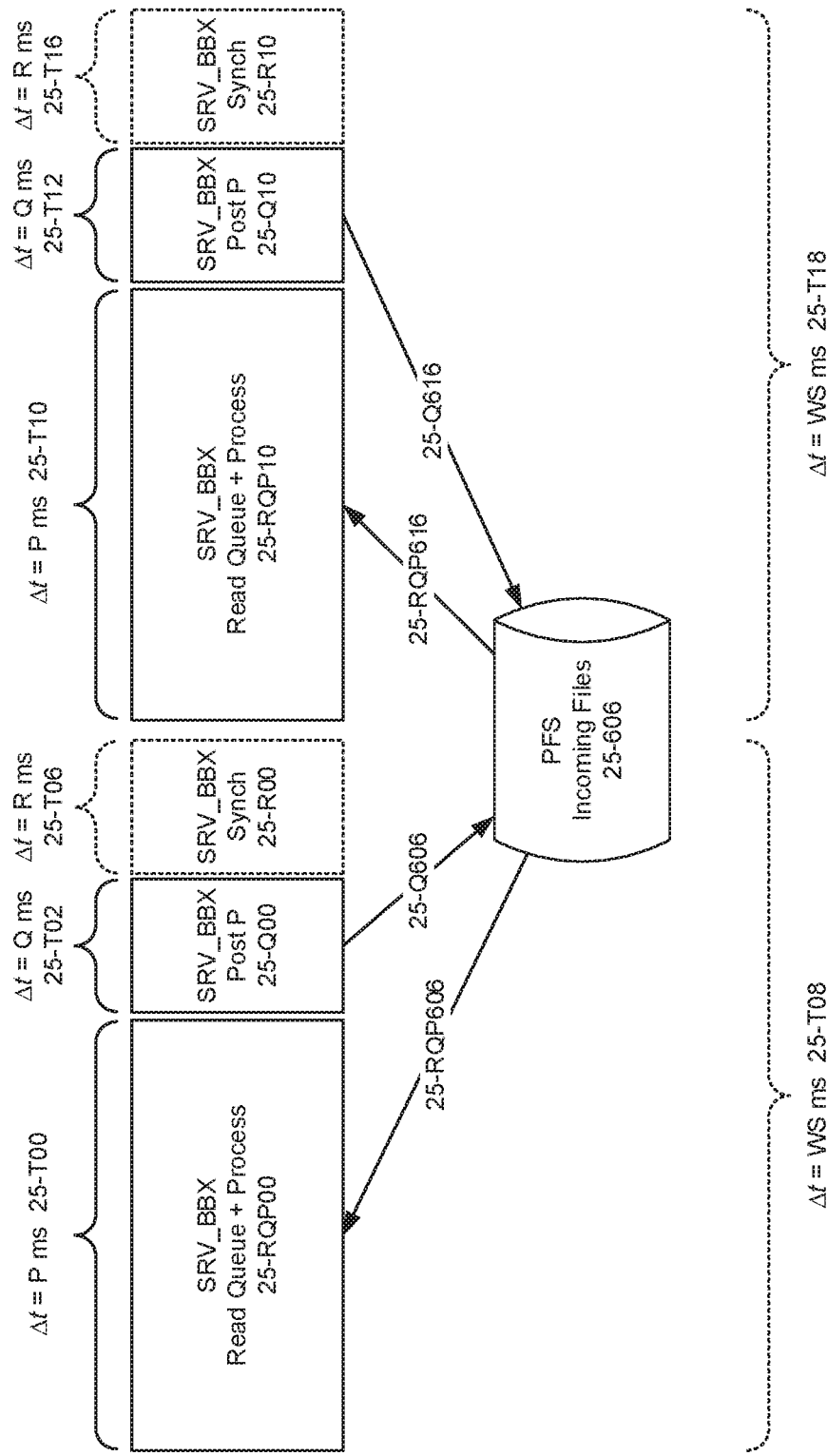
FIG. 25 describes in more detail the timing sequence of reading of files by sling nodes.

FIG. 24 resembles FIG. 24 from U.S. Provisional Patent Application No. 62/266,060 and FIG. 25 in International Patent Application No. PCT/IB16/01867 in all respects except that this figure includes Delay A 24-5102 between Interval A 24-5100 and Interval B 24-5110 (and between Batch Pull A 24-5200 and Batch Pull B 24-5210).

There is a further Delay B 24-5112 between Interval B 24-5110 and Interval C 24-5120 (and between Batch Pull B 24-5210 and Batch Pull C 24-5220).

The key point is that this delay allows for the current batch to evaluate and process all of the files it has pulled and where it has utilized complete files, to mark those files as read.

This delay added to the mechanism is fully dynamic and can be lengthened if more processing time is required for a batch or shortened if a batch processing is completed. The interval times can also be dynamically adjusted based on a number of factors.

FIG. 25 describes in more detail the timing sequence of reading of files by sling nodes. Read queue process RQP such as 25-RQP00 or 25-RQP10 are where files in the PFS incoming folder 25-606 are checked if complete, and when complete files are processed and incomplete files ignored. Post processing Q such as 25-Q00 and 25-Q10 are where the processed files are marked or otherwise handled. The synch stage is a delay or other form of time or other shift such as 25-R00 and 25-R10 between batches.

This figure demonstrates a fixed period for each batch, with the synch stage being variable to help keep the timing accurate. It also governs the maximum number of files that could be processed by a batch if the expected processing time and post-processing time would be exceeded if more files were to be processed.

$$\Delta t = P + Q + R \qquad \text{Equation 25-1:}$$

t=Delta time from the start of tick to end of the tick
P=Time for batch processing of items for this tick in the cycle.
Q=Time for post batch processing.
R=Time for delay to ensure no overlap between batch items and/or to set offset between ticks.

The granularity of a tick has been discussed in U.S. Provisional Patent Application No. 62/296,257. The granularity of a tick is based on a number of factors. The start time of a tick is either based on completion of the last cycle called by a tick or according to a fixed time interval scheduled.

There are two types of cycles. Fixed time cycle is based on an estimate for time per item to process (P) and then handle post processing (Q), a limited quantity of items is set. This limit ensures that each cycle does not run beyond its allotted allowed time. Variable time cycle allows for all items to be processed in that batch. The R delay time ensures that the next cycle pulls a fresh batch and that all items in the last processed batch have been processed (P) and that post processing (Q) has been completed. For example, for files in a queue—a list can be processed at the P stage and then the files can be marked, moved, deleted or otherwise touched so that they do not get pulled in the next batch. The time delay (R) ensures that there is enough delay between the last item processed and post-processed in the last batch and the first item to be processed in the next batch.

A component part of this tick manager is to maintain historical records of runtime data for each cycle. These logged records can be used to analyze periods of under usage and peak usage. It can also detect delays due to unprocessed items cut off because of limited quantities per cycle. If this occurs too often, then it is an indicator that either more processing power is required, that the software is inefficient, or it may indicate other issues such as database slowdowns or the need for software refactoring, and/or other issues.

The tick can have granularity as fine as required by the application, can be set to run at a fixed interval, or at various intervals based on cycle length. The granularity of a tick allows for consistent network beacon flashes, slingshot related functionality, and other time reliant functionality. For more features and details about The Granularity of a Tick are demonstrated in U.S. Provisional Patent Application No. 62/296,257.

This example demonstrates two batch file pulls on a backbone exchange server (SRV_BBX) with Read Queue+Process 25-RQP00 and Read Queue+Process 25-RQP10. They both pull files from the same storage media parallel file system PFS Incoming Files 25-606. Files pulled in 25-RQP00 via path 25-RQP606 are processed and then in post processing Post P 25-Q00 the files are marked via path 25-Q606.

This is a critically important point because the next batch file pull Read Queue+Process 25-RQP10 from PFS Incoming Files 25-606 via path 25-RQP616 should only include unmarked files or files not filled by previous batches. Then at Post P 25-Q10 the files pulled and used are marked via path 25-Q616 so that they will not be inadvertently pulled by a subsequent batch file pull.

Figure 26:
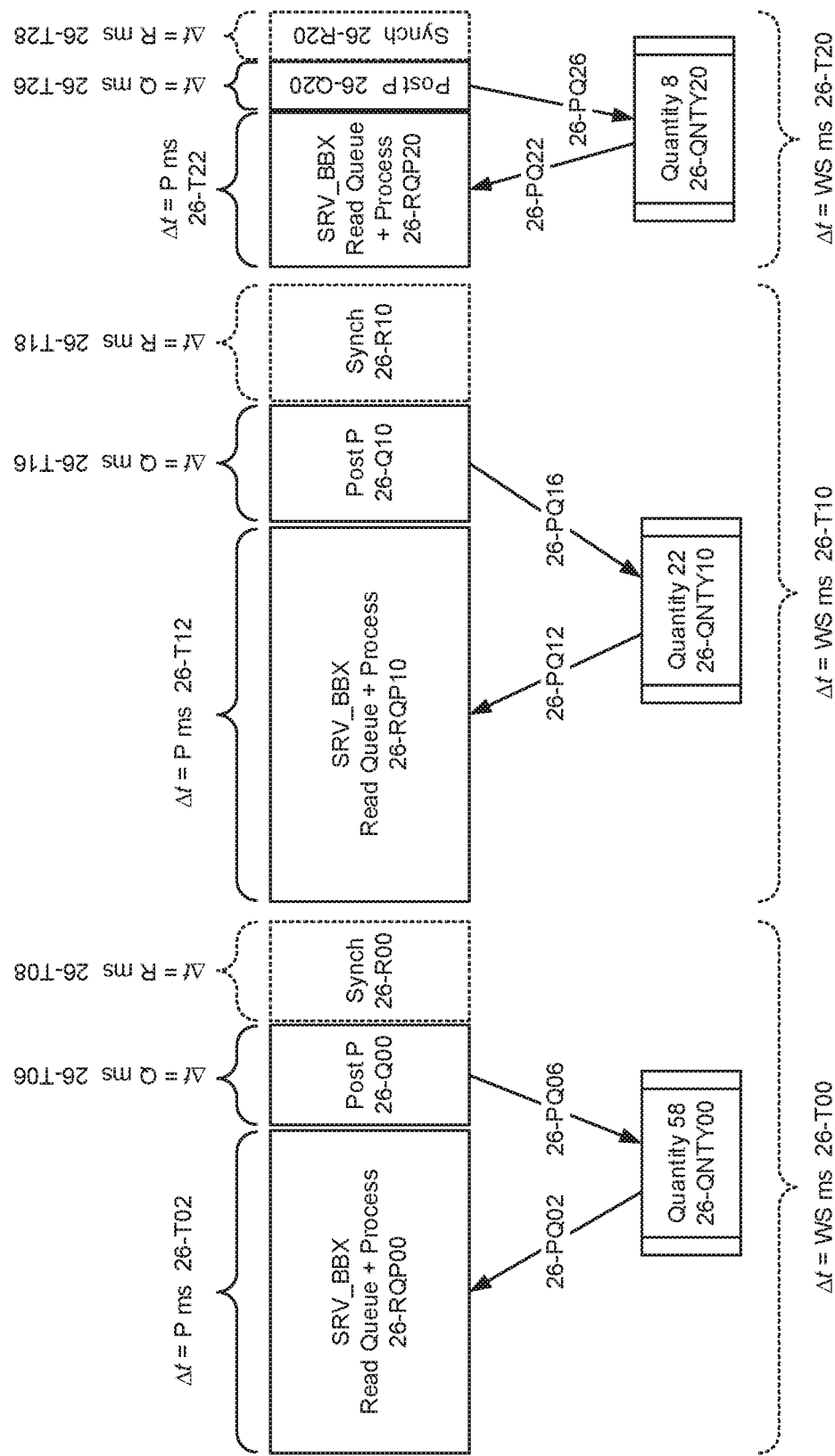
FIG. 26 demonstrates batches which are at a variable interval (not fixed time).

FIG. 26 demonstrates batches which are at a variable interval (not fixed time). The times 26-T00 and 26-T10 and 26-T20 are based on the number of items processed in each batch, with the next batch starting soon thereafter. FIG. 26 is similar to FIG. 25. However, it also illustrates the processing of variable quantities of files and how this affects both processing and post processing time as well as noting minimum delay before the next cycle should be executed.

There are three cycles noted herein: 26-T00, 26-T10 and 26-T20. And each has different respective quantities of Quantity 58 in 26-QNTY00, of Quantity 22 in 26-QNTY10, and of Quantity 8 in 26-QNTY20.

These varying quantities influence the time duration of each interval.

Figure 27:
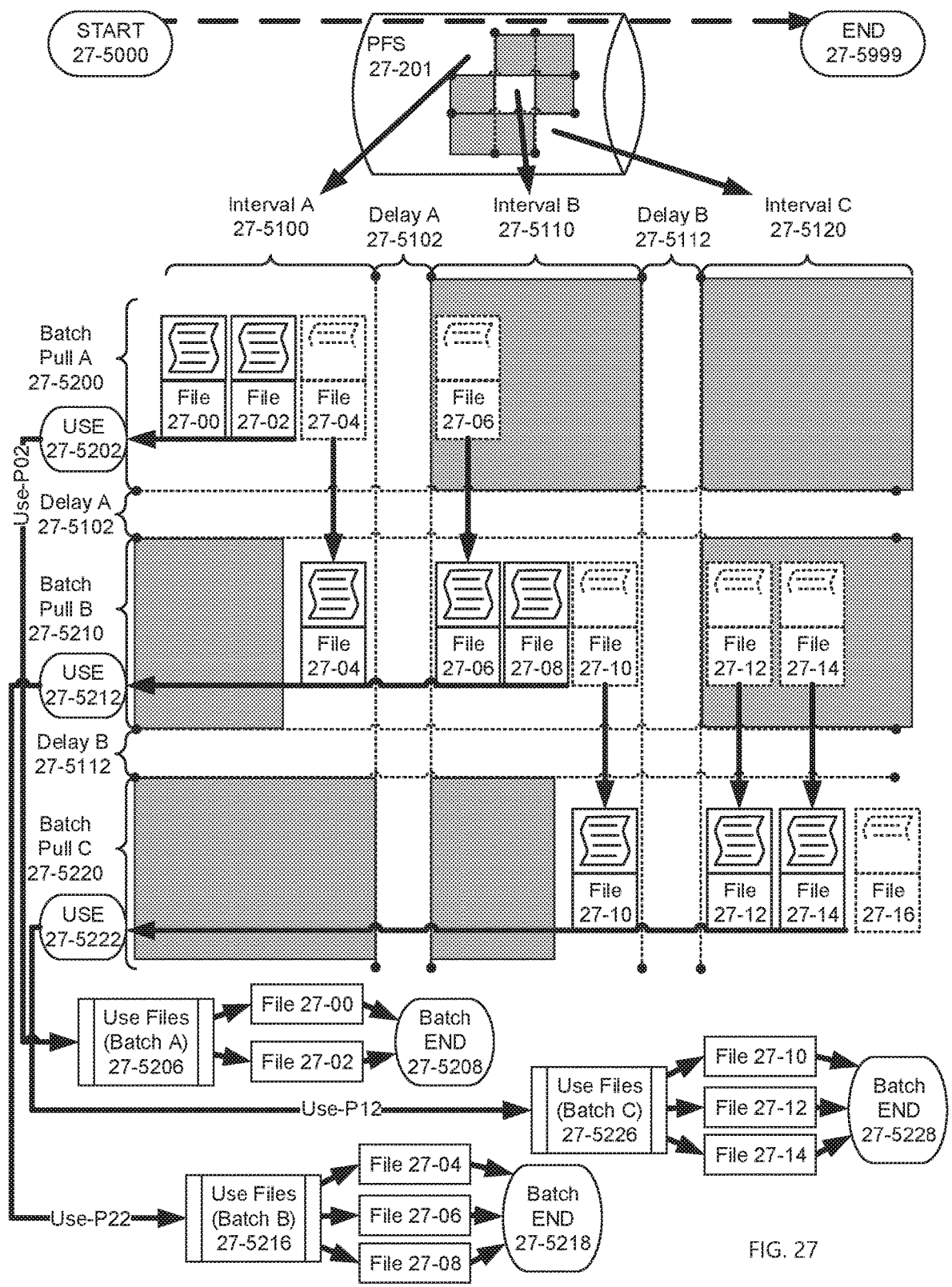
FIG. 27 illustrates batch processing of files with the addition of demonstrated individual files.

FIG. 27 is based on FIG. 24 and continues to describe batch processing of files with the addition of demonstrated individual files. The USE of the files illustrates USE 27-5202 of files in Batch Pull A 27-5200, USE 27-5212 of files in Batch Pull B 27-5210, and USE 27-5222 of files in Batch Pull C 27-5220.

Use Files (Batch A) 27-5206 sends files File 27-00 and File 27-02 in parallel and ends at Batch END 27-5208. Use Files (Batch B) 27-5216 sends files File 27-04 and File 27-06 and File 27-08 in parallel and ends at Batch END 27-5218. Use Files (Batch C) 27-5226 sends files File 27-10 and File 27-12 and File 27-14 in parallel and ends at Batch END 27-5228.

The key point is that the pull of files is in batches which are available in parallel and therefore the use phase is in parallel as well. Files not ready in Batch Pull A 27-5200 such as File 27-04 and File 27-06 will not be pulled and used until they are available. File 27-04 and 27-06 are pulled with File 27-08 in Batch Pull B 27-5210.

Figure 28:
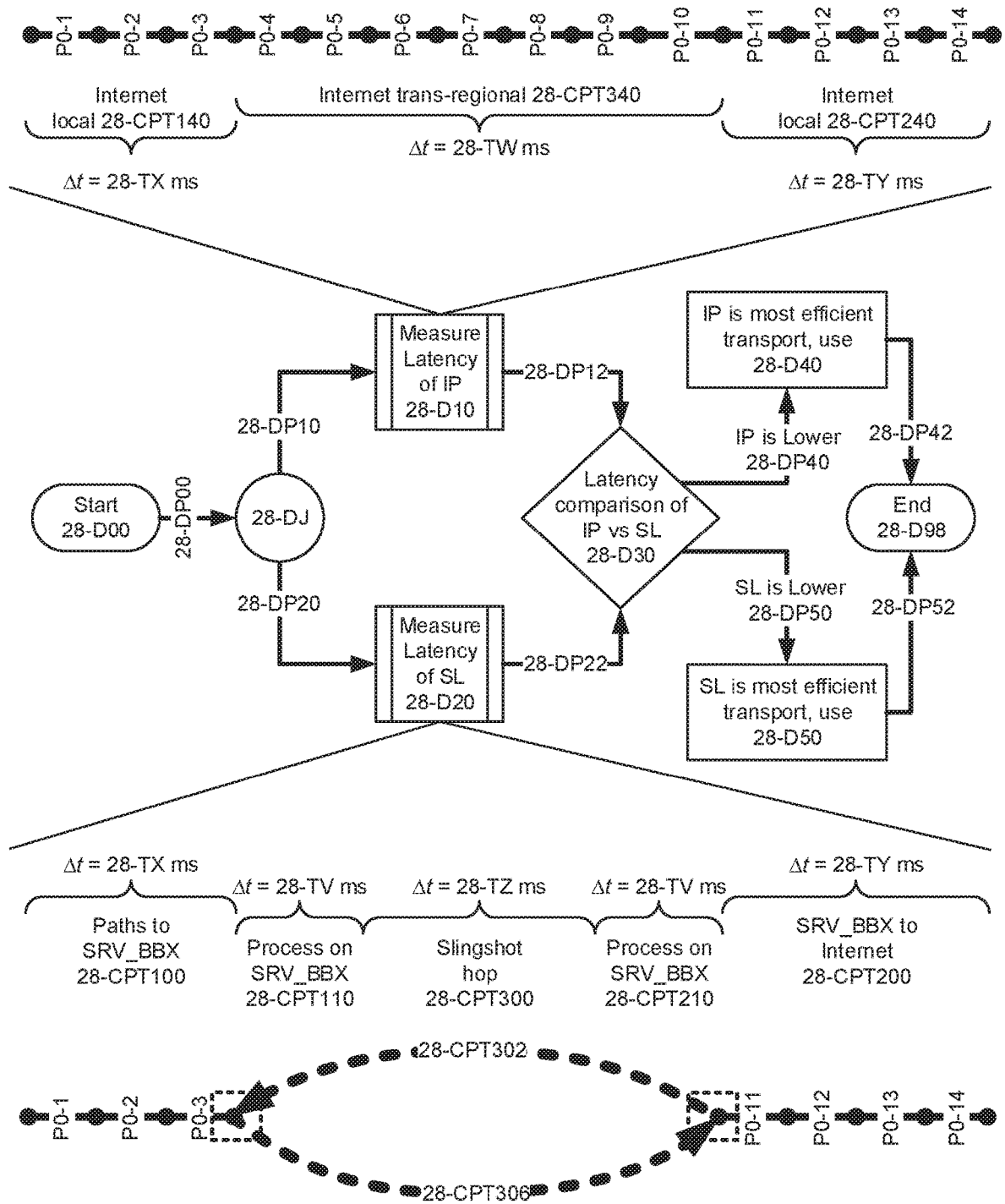
FIG. 28 describes an algorithm to evaluate which is a more efficient method of transport.

FIG. 28 describes an algorithm to evaluate which is a more efficient method of transport, either an internet pathway measure of latency 28-D10 or a Slingshot 28-D20.

The algorithmic decision logic of whether it is faster and/or more efficient to send packets via an internet path or through a Slingshot enhanced internet path with a Slinghop transparent segment between a pair (or more than one pair) of IP addresses. It does not consider reliability or loss or related congestion or other issues beyond latency which may influence the performance of the internet path.

There are inefficiencies of using Slinghop of Δt at each bridgehead of the Slinghop transparent hop segment versus the gain achieved via the utilization of Slinghop. A minimum distance is needed to compensate for the requisite processing time of the Slinghop mechanism. Measure Latency of IP 28-D10 uses Equation 13-1 to measure Total Internet Path Time Δt. Measure Latency of SL 28-D20 uses Equation 13-2 to measure Total Internet-Slinghop Hybrid Path Time Δt.

Latency comparison of IP vs SL 28-D30 uses Equation 14-1 $\Delta t\{TV+TZ+TV\}<\Delta t\{TW\ ms\}$. There is a decision "Latency comparison of IP vs SL 28-D30" that looks the latency for internet path 28-CPT340 in a measurement of ms 28-TW ms to see if it is higher or lower than the time for slingshot path 28-CPT302/28-CPT306 time measurement sum of values 28-TV+28 TZ+28-TV.

Figure 29:
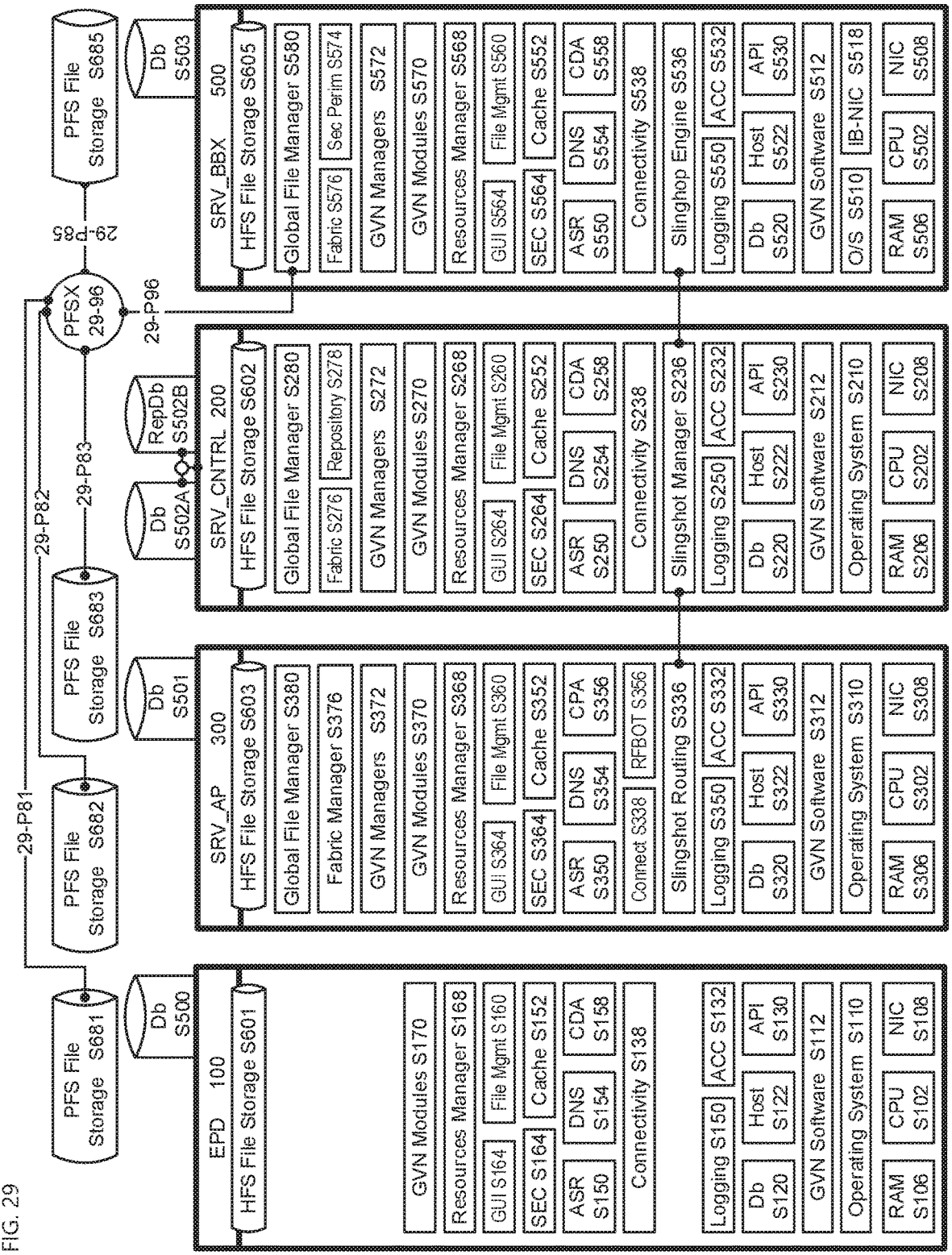
FIG. 29 describes the modules running on various devices to power Slinghop integrating into a GVN.

If True that Slinghop enhanced path ($\Delta t\{TV+TZ+TV\}$) has a lower latency SL is Lower 28-DP50 than internet path then "SL is most efficient transport, use" 28-D50 is the most optimal path If False and internet ($\Delta t\{TW\ ms\}$) is faster than Slinghop "IP is Lower" 28-DP40 then "IP is most efficient transport, use" 28-D40 is the most optimal path FIG. 29 describes the modules running on various devices to power Slinghop integrating into a GVN. This example embodiment demonstrates the stack of four devices, an end point device (EPD) 100, an access point server (SRV_AP) 300, a central, control server (SRV_CNTRL) 200, and a backbone exchange server (SRV_BBX) 500.

At SRV_BBX 500, it may also have one Slinghop router devices between it and the internet path. In this topology, SRV_BBX is infrastructure between internet and the backbone utilizing two reciprocal mechanisms. The Slingshot router can act as a path enabler for Slinghop. For example, in the internet data center (IDC), there can be a series of Slinghop routes as a front face. This mechanism can be configured as Slingshot client devices. Slingshot can be administered by a service provider and Slinghop routers by clients.

Some key elements have been highlighted. More elements may be present which have not been noted. Some of the elements noted are not directly influenced by, dependent on, or otherwise integrated with Slinghop but have been noted to show where in the stack that that items may be placed. The hierarchy and placement of items may indicate levels with elements near the top as high level items, and items at the bottom as lower level items. For example, the network interface card (NIC) S108, S308, S208, and S508 are all at a very low system level. The Operating System (O/S) S110, S310, S210, and S510 are above the NIC level and within the O/S there are driver files which interface with and operate the NIC. Some elements noted (and others not noted) may be at the appropriate level relative to other elements or they may need to be lower or higher, depending on use, context and other factors.

Other elements of GVN, Slingshot, Slinghop or other related technologies also include fabric manager, logging, AI, security, FW, secure boot manager (SBM), back channel mechanism (BCM), geographic destination (Geo-D), Resources Manager, GVN Modules, APPs, advanced smart routing (ASR), GVN Manager, Accounting, and others.

Slingshot manager manages hop listener, file buffer module (receive), file buffer manager (send), hop router, file sender, and other items.

The invention claimed is:

1. A network system for providing long haul network connection between endpoint devices, comprising:
   a first endpoint device;
   a second endpoint device;
   a first exchange server;
   a second exchange server;
   a first access point server coupled between the first endpoint device and the first exchange server;
   a second access point server coupled between the second endpoint device and the second exchange server;
   a first storage node coupled between the first exchange server and the second exchange server;
   a second storage node coupled between the first exchange server and the second exchange server;
   wherein the first exchange server is configured to (1) convert first packetized traffic received from the first endpoint device, via the first access point server, into a carrier file, and (2) write the carrier file to the second storage node; and
   wherein the second exchange server is configured to (1) read the carrier file from the second storage node and (2) convert the carrier file into second packetized traffic, wherein the second packetized traffic is sent to the second end device via the second access point server.

2. The network system of claim 1, wherein the second exchange server is further configured to (1) convert third packetized traffic received from the second endpoint device, via the second access point server, into a second carrier file, and (2) write the second carrier file to the first storage node, wherein the first exchange server is configured to (1) read the second carrier file from the first storage node and (2) convert the second carrier file into fourth packetized traffic, wherein the fourth packetized traffic is sent to the first end device via the first access point server.

3. The network system of claim 1, wherein at least one of the first endpoint device or the second endpoint device is associated with a unique device identity.

4. The network system of claim 1, wherein the first endpoint device is configured to receive the first packetized traffic from a third end point device.

5. The network system of claim 1, wherein the second endpoint device is configured to send the second packetized traffic to a third end point device.

* * * * *